United States Patent
Tao et al.

(10) Patent No.: US 12,032,820 B2
(45) Date of Patent: Jul. 9, 2024

(54) FAST DATA COPYING METHOD AND ELECTRONIC DEVICE

(71) Applicant: Huawei Technologies Co., Ltd., Shenzhen (CN)

(72) Inventors: Qiang Tao, Beijing (CN); Jing Han, Beijing (CN); Guangyuan Gao, Beijing (CN); Changwei Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 17/474,626

(22) Filed: Sep. 14, 2021

(65) Prior Publication Data

US 2022/0075518 A1 Mar. 10, 2022

Related U.S. Application Data

(63) Continuation of application No. 16/619,762, filed as application No. PCT/CN2017/102956 on Sep. 22, 2017, now Pat. No. 11,144,195.

(30) Foreign Application Priority Data

Jun. 7, 2017 (CN) .......................... 201710424245.0

(51) Int. Cl.
G06F 3/0481 (2022.01)
G06F 3/04817 (2022.01)
(Continued)

(52) U.S. Cl.
CPC ...... *G06F 3/04883* (2013.01); *G06F 3/04817* (2013.01); *G06F 3/0482* (2013.01); *G06F 9/451* (2018.02); *G06F 9/543* (2013.01)

(58) Field of Classification Search
CPC ............. G06F 3/04883; G06F 3/04817; G06F 3/0482; G06F 9/451; G06F 9/543; G06F 21/629; G06F 21/32

See application file for complete search history.

(56) References Cited

U.S. PATENT DOCUMENTS

2008/0082932 A1* 4/2008 Beumer .................. G06F 9/543
715/764
2009/0140998 A1 6/2009 Jung et al.
(Continued)

FOREIGN PATENT DOCUMENTS

CN 102681765 A 9/2012
CN 103294657 A 9/2013
(Continued)

OTHER PUBLICATIONS

Zukowski, J., "Java AWT Reference Chapter 16: Data Transfer" XP002664617, Jan. 1, 1997, 12 pages.

*Primary Examiner* — Phuong H Nguyen
(74) *Attorney, Agent, or Firm* — Conley Rose, P.C.

(57) ABSTRACT

Embodiments of this application provide a data processing method and an electronic device. The method may be implemented on an electronic device having a touchscreen, and may specifically include: displaying a graphical user interface of a first application on the touchscreen, where the graphical user interface includes a text; detecting, by the electronic device, a touch event that a user touches and holds a fingerprint button; enabling, by the electronic device, a fast copying function in response to the event; detecting, by the electronic device, a slide gesture for some data in the text; and in response to the slide gesture, storing, in a clipboard by the electronic device, the some data corresponding to the slide gesture. According to the technical solutions provided in the embodiments of this application, efficiency of the electronic device is improved, user operations are reduced, and user experience is improved.

20 Claims, 22 Drawing Sheets

(51) Int. Cl.
*G06F 3/0482* (2013.01)
*G06F 3/04883* (2022.01)
*G06F 9/451* (2018.01)
*G06F 9/54* (2006.01)

(56) References Cited

U.S. PATENT DOCUMENTS

| | | | |
|---|---|---|---|
| 2012/0229493 A1 | 9/2012 | Kim et al. | |
| 2012/0246594 A1 | 9/2012 | Han et al. | |
| 2013/0120271 A1 | 5/2013 | Lee et al. | |
| 2013/0232408 A1 | 9/2013 | Xu | |
| 2014/0013258 A1 | 1/2014 | Jang et al. | |
| 2014/0108538 A1 | 4/2014 | Borzycki et al. | |
| 2015/0026620 A1* | 1/2015 | Kwon | G06F 3/04886 715/770 |
| 2015/0186348 A1* | 7/2015 | Hicks | G06F 40/58 715/769 |
| 2016/0139766 A1* | 5/2016 | Kim | G06F 3/04842 715/802 |
| 2016/0154686 A1 | 6/2016 | Huang et al. | |
| 2017/0004316 A1* | 1/2017 | Walton | G06F 21/6245 |

FOREIGN PATENT DOCUMENTS

| | | |
|---|---|---|
| CN | 103853611 A | 6/2014 |
| CN | 104216654 A | 12/2014 |
| CN | 104346092 A | 2/2015 |
| CN | 105183362 A | 12/2015 |
| CN | 105653145 A | 6/2016 |
| CN | 106227612 A | 12/2016 |
| CN | 106445707 A | 2/2017 |
| CN | 106557258 A | 4/2017 |
| CN | 106776078 A | 5/2017 |
| EP | 2428894 A1 | 3/2012 |
| JP | 5943045 B2 | 6/2016 |

\* cited by examiner

FAST DATA COPYING METHOD AND ELECTRONIC DEVICE

This application is continuation of U.S. patent application Ser. No. 16/619,762 filed on Dec. 5, 2019, which is a U.S. National Stage of International Patent Application No. PCT/CN2017/102956 filed on Sep. 22, 2017, which claims priority to Chinese Patent Application No. 201710424245.0 filed on Jun. 7, 2017. All of the aforementioned applications are hereby incorporated by reference in their entireties.

TECHNICAL FIELD

This application relates to the data processing field, and in particular, to a data processing method and an electronic device.

BACKGROUND

In recent years, with rapid development of a touchscreen technology, an electronic device (for example, a mobile phone or a tablet computer) that uses a touchscreen is widely used. Currently, when the electronic device is used, copying and pasting are required in many scenarios. For example, a copying operation and a pasting operation often need to be performed in an instant messaging scenario or an office scenario. For example, when performing copying/pasting on a mobile phone, a user usually touches and holds a touchscreen in an application, and selects a text that needs to be copied; and then, returns to another application, touches and holds the touchscreen to pop up a dialog box, and selects a pasting operation. It can be learned from the foregoing that operations, such as copying and pasting, currently performed on the electronic device are excessively complex, and a solution of interaction between the electronic device and the user is extremely complex. Consequently, processing efficiency of the electronic device is greatly reduced.

SUMMARY

An objective of this application is to provide a data processing method and an electronic device, to greatly improve a human computer interaction capability of the electronic device, improve data processing efficiency of the electronic device, simplify user operation steps, and further improve user experience.

The foregoing objective and other objectives are achieved by using features in the independent claims. Further implementations are reflected in the dependent claims, this specification, and the accompanying drawings.

According to a first aspect, an embodiment of this application provides a data processing method. The method may be implemented on an electronic device having a touchscreen, and may specifically include the following steps: displaying a graphical user interface of a first application on the touchscreen, where the graphical user interface includes a text; receiving, by the electronic device, an input from a user, where the input includes one of the following: the user taps a control displayed on the touchscreen, or the user lightly taps a fingerprint button and keeps contact with the fingerprint button; enabling, by the electronic device, a fast copying function in response to the input; detecting, by the electronic device, a slide gesture for some data in the text; and in response to the slide gesture, storing, in a clipboard by the electronic device, the some data corresponding to the slide gesture. The foregoing technical solution provides a fast data copying method. After the fast copying function is enabled, the user can complete a copying operation only by lightly sliding on the touchscreen with a finger for data that needs to be copied. If the user further needs to copy other data after completing a previous fast copying operation, the user can fast complete another copying operation only by lightly sliding on the touchscreen with the finger for the other data. This operation manner is more efficient than a prior-art copying operation (to be specific, an operation in which the finger of the user touches and holds the touchscreen to display a copying control, and then taps the control for copying). Therefore, the electronic device provides the fast copying method. The method can greatly improve processing efficiency of the electronic device, simplify operation steps, and further improve use experience of the user.

In a possible implementation, the method may further include the following steps: displaying a graphical user interface of a second application on the touchscreen, where the graphical user interface includes an input box; detecting, by the electronic device, a touch event of the user; displaying a to-be-pasted list on the touchscreen in response to the touch event, where the to-be-pasted list includes two or more pieces of data stored in the clipboard; detecting, by the electronic device, a touch gesture of the user for the to-be-pasted list; and in response to the touch gesture, determining, by the electronic device, data corresponding to the touch gesture, and displaying the data in the input box. In this implementation, the to-be-pasted list may display a plurality of pieces of data, to help the user to perform selection. This further improves data pasting efficiency of the electronic device.

In another possible implementation, the method may further include: after displaying, in the input box, the data corresponding to the touch gesture, erasing, by the electronic device, the data stored in the clipboard. The data does not need to be still stored in the clipboard because the data has been pasted and displayed in the input box. Therefore, the electronic device may erase the data, to save storage space of the electronic device.

In another possible implementation, the to-be-pasted list displays the data and an application identifier corresponding to the data. For example, if the to-be-pasted list displays data "13612345678 (Messages)", it indicates that copied data is "13612345678", and an application identifier (which may be understood as an application name) corresponding to the data is "Messages", in other words, the data is copied from Messages. In this way, the user very easily knows an application from which the data in the to-be-pasted list respectively comes. This further facilitates user operations and improves user experience.

In another possible implementation, the slide gesture may be specifically a gesture generated after a finger of the user lightly taps the touchscreen, quickly or slowly moves for a distance without leaving the touchscreen, and then lifts.

In another possible implementation, the text is displayed in full screen on the touchscreen after the fast copying function is enabled, to help the user to perform fast copying. This further improves processing efficiency of the electronic device.

In another possible implementation, if the input from the user is that a finger of the user lightly taps the fingerprint button and keeps contact with the fingerprint button, the electronic device may collect a fingerprint of the user by using a fingerprint recognizer in the fingerprint button, and compare the fingerprint with a prestored valid fingerprint for verification; and the electronic device enables the fast copying function only after verification on the fingerprint succeeds. In this way, the electronic device can better enhance data security of the user.

In another possible implementation, the to-be-pasted list further displays a source identifier of the data, and the source identifier marks data from different copying sources differently.

In another possible implementation, the to-be-pasted list is displayed above the input box.

In another possible implementation, the first application may be WeChat, and the second program may be Messages.

According to a second aspect, an embodiment of this application provides an electronic device, including a touchscreen, a memory, one or more processors, a plurality of applications, and one or more computer programs, where the one or more computer programs are stored in the memory, and the electronic device is configured to perform the method in the first aspect.

According to a third aspect, an embodiment of this application provides a data processing method. The method may be implemented on an electronic device having a touchscreen, and may specifically include the following steps: displaying a graphical user interface of a first application on the touchscreen; detecting, by the electronic device, a first touch event on the touchscreen; in response to the first touch event, selecting data corresponding to the first touch event, and displaying a first control and a second control on the touchscreen, where the first control is used to copy the data into a private queue of a clipboard, data in the private queue can be pasted only inside the first application, the second control is used to copy the data into a public queue of the clipboard, and data in the public queue is pasted in any application; detecting, by the electronic device, a second touch event for the first control or the second control on the touchscreen; and storing, by the electronic device, the selected data in the private queue or the public queue in response to the second touch event. In the foregoing technical solution, the first control used for intra-application copying and the second control used for global copying are displayed on the touchscreen, so that a user can very intuitively copy the selected data, and further store the copied data at different locations, namely, in different queues, of the clipboard.

In a possible implementation, the first touch event may be a gesture generated after a finger of the user lightly taps the touchscreen, quickly or slowly moves for a distance without leaving the touchscreen, and then lifts; or the second touch event is that a finger of the user lightly taps a location corresponding to the first control or the second control on the touchscreen.

In a possible implementation, the method further includes: detecting, by the electronic device, a third touch event for an input box in a second application on the touchscreen; displaying a to-be-pasted list on the touchscreen in response to the third touch event, where the to-be-pasted list includes two or more pieces of data, and the data comes from the clipboard; detecting, by the electronic device, a fourth touch event of the user for the to-be-pasted list on the touchscreen; and displaying, in the input box, one or more pieces of data in the to-be-pasted list in response to the fourth touch event. In the technical solution, the to-be-pasted list may display a plurality of pieces of data, to help the user to perform selection. This further improves data pasting efficiency of the electronic device.

In a possible implementation, the third touch event may be that a finger of the user touches and holds or heavily presses a location corresponding to the input box on the touchscreen; or the fourth touch event is that a finger of the user lightly taps a location corresponding to the to-be-pasted list on the touchscreen.

In a possible implementation, the displaying the to-be-pasted list on the touchscreen in response to the third touch event may specifically include the following steps: in response to the third touch event, determining, by the electronic device, the second application corresponding to the third touch event; determining, by the electronic device, the to-be-pasted list based on the determined second application and data stored in the chipboard; and displaying the to-be-pasted list on the touchscreen. In this technical solution, the electronic device may intelligently determine the data in the to-be-pasted list based on the determined second application and the data stored in the clipboard, to further improve processing efficiency of the electronic device.

In a possible implementation, the determining, by the electronic device, the to-be-pasted list based on the determined application and data stored in the chipboard may specifically include: determining, by the electronic device, first data in the public queue and second data from the second application in the private queue; and determining, by the electronic device, the to-be-pasted list based on the first data and the second data. In this technical solution, the data in the to-be-pasted list may come from the public queue of the clipboard, or may come from the private queue of the clipboard. In other words, the to-be-pasted list may include all data in the public queue of the clipboard and data from the determined second application in the private queue of the clipboard. For example, if the determined second application is Messages, the electronic device may first determine first data in the public queue of the clipboard, where the first data is in the public queue and therefore the to-be-pasted list certainly displays the data; and then the electronic device may determine second data from Messages in the private queue of the clipboard. The electronic device may determine the to-be-pasted list based on the first data and the second data, in other words, determine data included in the to-be-pasted list.

In another possible implementation, the to-be-pasted list displays the data and an application identifier corresponding to the data. For example, if the to-be-pasted list displays data "13612345678 (Messages)", it indicates that copied data is "13612345678", and an application identifier (which may be understood as an application name) corresponding to the data is "Messages", in other words, the data is copied from Messages. In this way, the user very easily knows an application from which the data in the to-be-pasted list respectively comes. This further facilitates user operations and improves user experience.

According to a fourth aspect, an embodiment of this application further provides an electronic device, including a touchscreen, a memory, one or more processors, a plurality of applications, and one or more computer programs, where the one or more computer programs are stored in the memory, and the electronic device is configured to perform the method in the third aspect.

According to a fifth aspect, an embodiment of this application provides an electronic device, including: a touchscreen, where the touchscreen includes a touch-sensitive surface and a display screen; one or more processors; a memory; a plurality of applications; and one or more computer programs, where the one or more computer programs are stored in the memory, the one or more computer programs include an instruction, and when the instruction is executed by the electronic device, the electronic device performs the following steps: displaying a graphical user interface of a first application on the touchscreen, where the graphical user interface includes a text; receiving, by the electronic device, an input from a user, where the input includes one of the following: the user taps a control displayed on the touchscreen, or the user lightly taps a fingerprint button and keeps contact with the fingerprint button; enabling, by the electronic device, a fast copying function in response to the input; detecting, by the electronic device, a slide gesture for some data in the text; and in response to the slide gesture, storing, in a clipboard by the electronic device, the some data corresponding to the slide gesture.

In a possible implementation, the instruction is further used to perform the following steps: displaying a graphical user interface of a second application on the touchscreen, where the graphical user interface includes an input box; detecting, by the electronic device, a touch event of the user; displaying a to-be-pasted list on the touchscreen in response to the touch event, where the to-be-pasted list includes two or more pieces of data stored in the clipboard; detecting, by the electronic device, a touch gesture of the user for the to-be-pasted list; and in response to the touch gesture, determining, by the electronic device, data corresponding to the touch gesture, and displaying the data in the input box.

In a possible implementation, the instruction is further used to perform the following step: after displaying, in the input box, the data corresponding to the touch gesture, erasing, by the electronic device, the data stored in the clipboard.

In a possible implementation, the to-be-pasted list displays the data and an application identifier corresponding to the data.

According to a sixth aspect, an embodiment of this application provides an electronic device, including: a touchscreen, where the touchscreen includes a touch-sensitive surface and a display screen; one or more processors; a memory; a plurality of applications; and one or more computer programs, where the one or more computer programs are stored in the memory, the one or more computer programs include an instruction, and when the instruction is executed by the electronic device, the electronic device performs the following steps: displaying a graphical user interface of a first application on the touchscreen; detecting, by the electronic device, a first touch event on the touchscreen; in response to the first touch event, selecting data corresponding to the first touch event, and displaying a first control and a second control on the touchscreen, where the first control is used to copy the data into a private queue of a clipboard, data in the private queue can be pasted only inside the first application, the second control is used to copy the data into a public queue of the clipboard, and data in the public queue is pasted in any application; detecting, by the electronic device, a second touch event for the first control or the second control on the touchscreen; storing, by the electronic device, the selected data in the private queue or the public queue in response to the second touch event; detecting, by the electronic device, a third touch event for an input box in a second application on the touchscreen; displaying a to-be-pasted list on the touchscreen in response to the third touch event, where the to-be-pasted list includes two or more pieces of data, and the data comes from the clipboard; detecting, by the electronic device, a fourth touch event of a user for the to-be-pasted list on the touchscreen; and displaying, in the input box, one or more pieces of data in the to-be-pasted list in response to the fourth touch event.

In a possible implementation, the displaying the to-be-pasted list on the touchscreen in response to the third touch event may specifically include: in response to the third touch event, determining, by the electronic device, the second application corresponding to the third touch event; determining, by the electronic device, the to-be-pasted list based on the determined second application and data stored in the chipboard; and displaying the to-be-pasted list on the touchscreen.

In a possible implementation, the determining, by the electronic device, the to-be-pasted list based on the determined application and data stored in the chipboard may specifically include: determining, by the electronic device, first data in the public queue and second data from the second application in the private queue; and determining, by the electronic device, the to-be-pasted list based on the first data and the second data.

According to a seventh aspect, an embodiment of this application further provides a data processing apparatus. The apparatus includes a detection module, a determining module, a display module, and a storage module, where the detection module is configured to detect an input from a user; the display module is connected to the storage module, and is configured to display a graphical user interface that is of an application and that is stored in the storage module, where the graphical user interface includes data in different formats; the storage module is configured to store data, where the data includes data in a clipboard; the display module is further configured to display a graphical user interface of a first application; the detection module is further configured to detect a first touch event of the user; in response to the first touch event, the determining module determines that data that is corresponding to the first touch event and that is displayed on the display module is selected and that a first control and a second control are displayed on the display module, where the first control is used to copy the selected data into a private queue of the clipboard, data in the private queue can be pasted only inside the first application, the second control is used to copy the selected data into a public queue of the clipboard, and data in the public queue is pasted in any application; the detection module is further configured to detect a second touch event for the first control or the second control; and the determining module is further configured to store the selected data in the private queue or the public queue in response to the second touch event.

In a possible implementation, the detection module is further configured to detect a third touch event for an input box in a second application; in response to the third touch event, the determining module determines a to-be-pasted list that needs to be displayed, where the to-be-pasted list includes two or more pieces of data, the data comes from the clipboard, and the to-be-pasted list displays the data and an application identifier corresponding to the data; and the display module is further configured to display the to-be-pasted list determined by the determining module.

In a possible implementation, the detection module is further configured to detect a fourth touch event of the user for the to-be-pasted list; and one or more pieces of data in the to-be-pasted list are displayed in the input box in response to the fourth touch event.

In another possible implementation, that the determining module determines a to-be-pasted list that needs to be displayed may specifically include: in response to the third touch event, determining, by the determining module, the second application corresponding to the third touch event; determining, by the determining module, first data in the public queue and second data from the second application in the private queue based on the second application; and determining, by the determining module, the to-be-pasted list based on the first data and the second data.

According to an eighth aspect, this application further provides a computer-readable storage medium, where the computer-readable storage medium stores an instruction, and a computer performs the methods in the foregoing aspects when the computer-readable storage medium runs on the computer.

According to a ninth aspect, this application further provides a computer program product that includes an instruction, where a computer performs the methods in the foregoing aspects when the computer program product runs on the computer.

According to a tenth aspect, an embodiment of this application provides a data processing apparatus. The apparatus has a function of implementing behavior of the electronic device in the foregoing methods. The function may be implemented by hardware, or may be implemented by executing corresponding software by hardware. The hardware or the software includes one or more modules corresponding to the function.

These aspects and other aspects of this application are simpler and easier to understand in descriptions of the following embodiments.

It should be understood that descriptions of technical features, technical solutions, beneficial effects, or similar statements in this application do not imply that all features and advantages can be implemented in any single embodiment. On the contrary, it may be understood that descriptions of the features or the beneficial effects mean that at least one embodiment includes a specific technical feature, technical solution, or beneficial effect. Therefore, descriptions of the technical features, the technical solutions, or the beneficial effects in this specification may not necessarily be specific to a same embodiment. Further, the technical features, the technical solutions, or the beneficial effects described in the embodiments of this application may be combined in any proper manner. A person skilled in the art may understand that a specific embodiment may be implemented without using one or more specific technical features, technical solutions, or beneficial effects of the embodiment. In other embodiments, additional technical features and beneficial effects may further be identified in a specific embodiment that does not reflect all the embodiments.

DESCRIPTION OF EMBODIMENTS

Terms used in the embodiments of this application are merely used for the purpose of describing specific embodiments, but are not intended to limit this application. As used in this specification and the appended claims of this application, singular expression forms "one", "a", "the", "the foregoing", and "this" are also intended to include plural expression forms, unless otherwise specified in the context clearly.

The following describes embodiments of an electronic device, a graphical user interface (which may be briefly referred to as GUI below) used for the electronic device, and a binding process used for using the electronic device. In some embodiments of this application, the electronic device may be a portable electronic device that further includes another function such as a personal digital assistant function or a music player function, for example, a mobile phone, a tablet computer, or a wearable electronic device (for example, a smartwatch) having a wireless communication function. An example embodiment of the portable electronic device includes but is not limited to a portable electronic device to which iOS®, Android®, Windows®, or another operating system is attached. The portable electronic device may alternatively be another portable electronic device such as a laptop computer (Laptop) having a touch-sensitive surface (for example, a touch panel). It should be further understood that, in some other embodiments of this application, the electronic device may not be a portable electronic device, but is a desktop computer having a touch-sensitive surface (for example, a touch panel).

Figure 1:
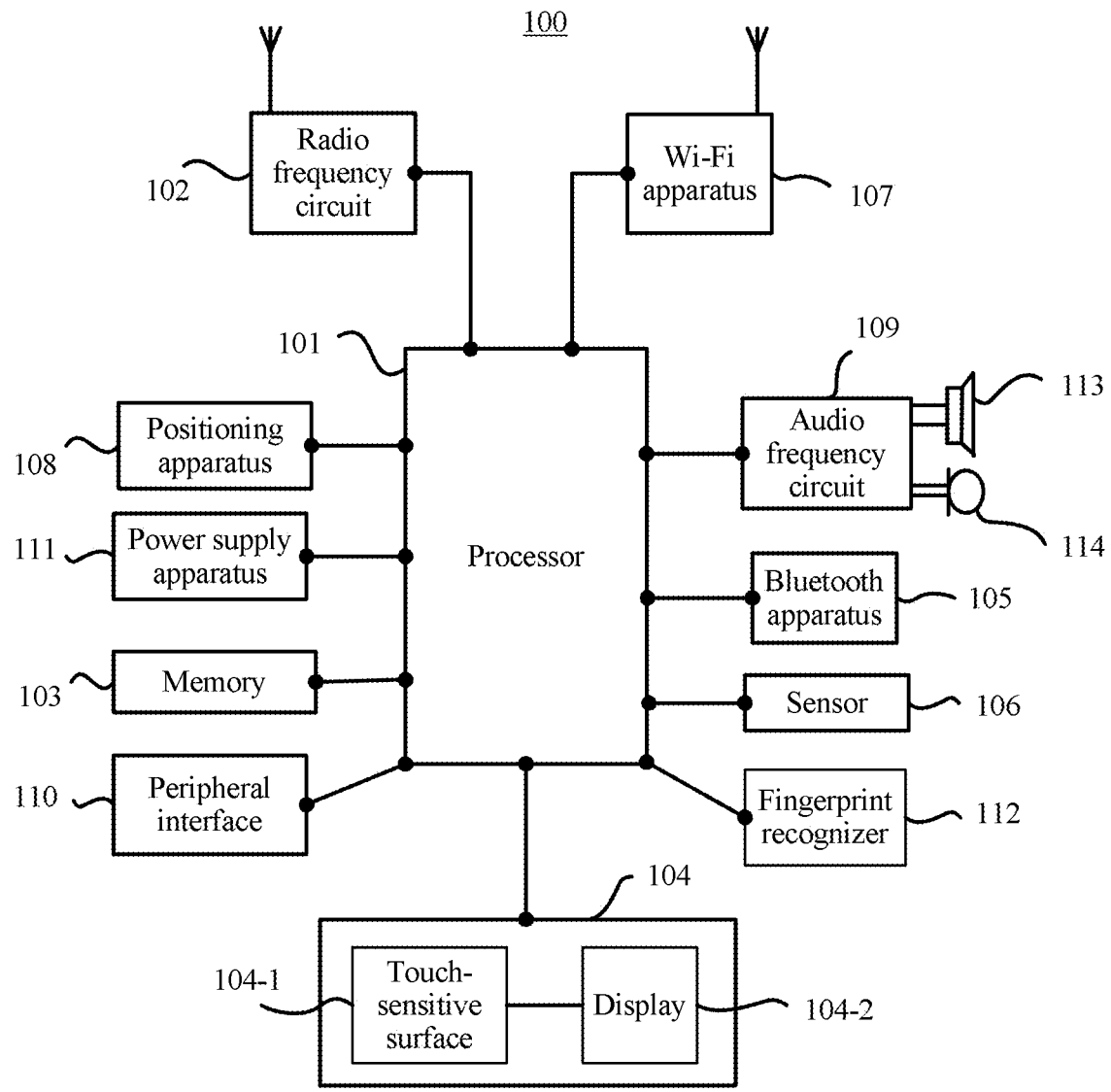
FIG. 1 is a schematic diagram of a hardware structure of a mobile phone 100 according to some embodiments.

As shown in FIG. 1, an electronic device in an embodiment of this application may be a mobile phone 100. The following describes this embodiment in detail by using the mobile phone 100 as an example. It should be understood that the mobile phone 100 shown in the figure is merely an example of the electronic device, and the mobile phone 100 may have more or fewer components than those shown in the figure, may combine two or more components, or may have different component configurations. Various components shown in the figure may be implemented in hardware that includes one or more signal processing or application-specific integrated circuits, in software, or in a combination of hardware and software.

As shown in FIG. 1, the mobile phone 100 may specifically include components such as a processor 101, a radio frequency (radio frequency, RF) circuit 102, a memory 103, a touchscreen 104, a Bluetooth apparatus 105, one or more sensors 106, a Wi-Fi apparatus 107, a positioning apparatus 108, an audio frequency circuit 109, a peripheral interface 110, a power supply apparatus 111, and a fingerprint recognizer 112. These components may perform communication by using one or more communications buses or signal cables (not shown in FIG. 1). A person skilled in the art may understand that a hardware structure shown in FIG. 1 constitutes no limitation on the mobile phone 100, and the mobile phone 100 may include more or fewer components than those shown in the figure, may combine some components, or may have different component arrangements.

The following describes the components of the mobile phone 100 in detail with reference to FIG. 1.

The processor 101 is a control center of the mobile phone 100, is connected to all parts of the mobile phone 100 by using various interfaces and lines, and performs various functions of the mobile phone 100 and data processing by running or executing an application stored in the memory 103 and invoking data and an instruction that are stored in the memory 103. In some embodiments, the processor 101 may include one or more processing units. An application processor and a modem processor may alternatively be integrated into the processor 101. The application processor mainly processes an operating system, a user interface, an application, and the like. The modem processor mainly processes wireless communication. It may be understood that the modem processor may not be integrated into the processor 101. For example, the processor 101 may be a Kirin 960 multi-core processor manufactured by Huawei Technologies Co., Ltd.

The radio frequency circuit 102 may be configured to receive and send a radio signal in an information receiving and sending process or in a call process. Specifically, after receiving downlink data from a base station, the radio frequency circuit 102 may send the downlink data to the processor 101 for processing. In addition, the radio frequency circuit 102 sends uplink data to the base station. The radio frequency circuit usually includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication, and includes but is not limited to a Global System for Mobile Communications, a general packet radio service, Code Division Multiple Access, Wideband Code Division Multiple Access, Long Term Evolution, an email, a short message service, and the like.

The memory 103 is configured to store an application and data. The processor 101 performs various functions of the mobile phone 100 and data processing by running the application and the data stored in the memory 103. The memory 103 mainly includes a program storage area and a data storage area. The program storage area may store an operating system, and an application required by at least one function (for example, a sound play function or an image play function). The data storage area may store data (for example, audio data or a phone book) created based on use of the mobile phone 100. In addition, the memory 103 may include a high-speed random access memory, and may further include a nonvolatile memory, for example, a magnetic disk storage device, a flash storage device, or another volatile solid-state storage device. The memory 103 may store various operating systems such as an iOS® operating system developed by Apple and an Android® operating system developed by Google.

The touchscreen 104 may include a touch-sensitive surface 104-1 and a display 104-2. The touch-sensitive surface 104-1 (for example, a touch panel) may collect a touch event performed by a user of the mobile phone 100 on or near the touch-sensitive surface 104-1 (for example, an operation performed by the user on the touch-sensitive surface 104-1 or near the touch-sensitive surface 104-1 by using any proper object such as a finger or a stylus), and send collected touch information to another component, for example, the processor 101. A touch event performed by the user near the touch-sensitive surface 104-1 may be referred to as a floating touch. The floating touch may mean that the user does not need to directly touch a touchpad for selecting, moving, or dragging an object (for example, an icon), and the user only needs to be near the electronic device to perform a desired function. In an application scenario of the floating touch, terms such as "touch" and "contact" do not imply that the user directly touches the touchscreen, but mean a contact near or close to the touchscreen. The touch-sensitive surface 104-1 on which the floating touch can be performed may be implemented by using a capacitive type, an infrared light sensor, an ultrasonic wave, or the like. The touch-sensitive surface 104-1 may include two parts: a touch detection apparatus and a touch controller. The touch detection apparatus detects a touch direction of the user, detects a signal brought by a touch operation, and transfers the signal to the touch controller. The touch controller receives touch information from the touch detection apparatus, converts the touch information into coordinates of a touch point, and then sends the coordinates of the touch point to the processor 101. The touch controller may further receive and execute an instruction sent by the processor 101. In addition, the touch-sensitive surface 104-1 may be implemented by using a plurality of types such as a resistive type, a capacitive type, an infrared ray, and a surface acoustic wave. The display (also referred to as a display screen) 104-2 may be configured to display information entered by the user or information provided for the user, and various menus of the mobile phone 100. The display 104-2 can be configured in a form of a liquid crystal display, an organic light emitting diode, or the like. The touch-sensitive surface 104-1 may cover the display 104-2. When detecting a touch event on or near the touch-sensitive surface 104-1, the touch-sensitive surface 104-1 transfers the touch event to the processor 101 to determine a type of the touch event. Then, the processor 101 may provide a corresponding visual output on the display 104-2 based on the type of the touch event. Although in FIG. 1, the touch-sensitive surface 104-1 and the display screen 104-2 are used as two independent parts to implement input and output functions of the mobile phone 100, in some embodiments, the touch-sensitive surface 104-1 and the display screen 104-2 may be integrated to implement the input and output functions of the mobile phone 100. It may be understood that the touchscreen 104 is formed by stacking a plurality of layers of materials. In this embodiment of this application, only the touch-sensitive surface (layer) and the display screen (layer) are displayed, and another layer is not recorded in this embodiment of this application. In addition, in some other embodiments of this application, the touch-sensitive surface 104-1 may cover the display 104-2, and a size of the touch-sensitive surface 104-1 is greater than a size of the display screen 104-2. Therefore, the display screen 104-2 is entirely covered by the touch-sensitive surface 104-1. Alternatively, the touch-sensitive surface 104-1 may be configured on the front of the mobile phone 100 in a full panel form, in other words, any touch performed by the user on the front of the mobile phone 100 can be sensed by the mobile phone. In this way, full touch control experience on the front of the mobile phone can be implemented. In some other embodiments, the touch-sensitive surface 104-1 is configured on the front of the mobile phone 100 in the full panel form, and the display screen 104-2 may also be configured on the front of the mobile phone 100 in the full panel form. In this way, a bezel-less structure can be implemented on the front of the mobile phone. In some other embodiments of this application, the touchscreen 104 may further include one or more groups of sensor arrays, so that the touchscreen 104 may also sense pressure applied by the user on the touchscreen 104 while sensing a touch event performed by the user on the touchscreen 104.

In various embodiments of this application, the mobile phone 100 may further have a fingerprint recognition function. For example, the fingerprint recognizer 112 may be configured on the back of the mobile phone 100 (for example, below a rear-facing camera), or the fingerprint recognizer 112 may be configured on the front of the mobile phone 100 (for example, below the touchscreen 104). In addition, the fingerprint recognizer 112 may be configured in the touchscreen 104 to implement the fingerprint recognition function. In other words, the fingerprint recognizer 112 may be integrated with the touchscreen 104 to implement the fingerprint recognition function of the mobile phone 100. In this case, the fingerprint recognizer 112 may be configured in the touchscreen 104 and may be a part of the touchscreen 104, or may be configured in the touchscreen 104 in another manner. In addition, the fingerprint recognizer 112 may also be implemented as a full panel fingerprint recognizer. Therefore, the touchscreen 104 may be considered as a panel on which a fingerprint can be collected at any location. The fingerprint recognizer 112 may send a collected fingerprint to the processor 101, so that the processor 101 processes the fingerprint (for example, verifies the fingerprint). In this embodiment of this application, a main component of the fingerprint recognizer 112 is a fingerprint sensor, and the fingerprint sensor may use any type of sensing technology, including but not limited to an optical sensing technology, a capacitive sensing technology, a piezoelectric sensing technology, an ultrasonic wave sensing technology, or the like. In addition, for a specific technical solution of integrating a fingerprint collection device into the touchscreen in this embodiment of this application, refer to PCT Patent Application No. PCT/CN2017/084602, entitled "INPUT METHOD AND ELECTRONIC DEVICE", which is incorporated in the embodiments of this application by reference in its entirety.

The mobile phone 100 may further include the Bluetooth apparatus 105, configured to implement data exchange between the mobile phone 100 and another electronic device (for example, a mobile phone or a smartwatch) at a short distance from the mobile phone 100. In this embodiment of this application, the Bluetooth apparatus may be an integrated circuit, a Bluetooth chip, or the like.

Figure 11:
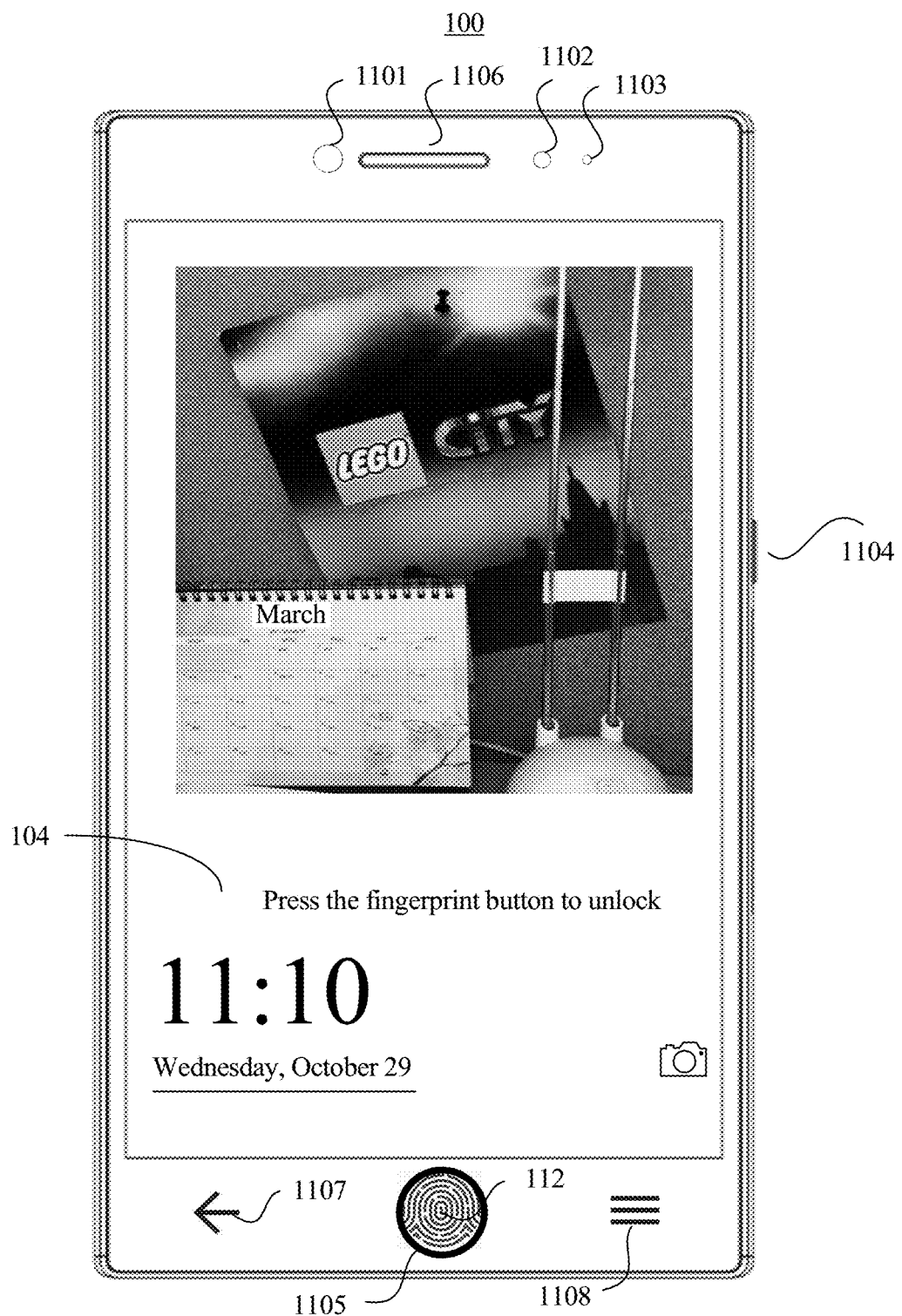
FIG. 11 is a schematic diagram of an electronic device and a graphical user interface of the electronic device according to some embodiments.

The mobile phone 100 may further include at least one type of sensor 106, such as a light sensor, a motion sensor, or another sensor. Specifically, as shown in FIG. 11, the light sensor may include an ambient light sensor 1102 and a proximity sensor 1103. The ambient light sensor may adjust luminance of the display of the touchscreen 104 based on brightness of ambient light, and the proximity sensor may power off the display when the mobile phone 100 moves to an ear. As one type of motion sensor, an accelerometer sensor may detect values of accelerations in all directions (usually, three axes), may detect a value and a direction of gravity when the accelerometer sensor is stationary, and may be used in an application for identifying a mobile phone posture (for example, screen switching between a landscape mode and a portrait mode, a related game, or magnetometer posture calibration), a function related to vibration identification (for example, a pedometer or a knock), and the like. Other sensors such as a gyroscope, a barometer, a hygrometer, a thermometer, and an infrared sensor that may be further configured on the mobile phone 100 are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user to receive and send an email, browse a web page, access streaming media, and the like. The Wi-Fi apparatus 107 provides wireless broadband Internet access for the user. In some other embodiments, the Wi-Fi apparatus 107 may alternatively be used as a Wi-Fi wireless access point, and may provide Wi-Fi network access for another electronic device.

The positioning apparatus 108 is configured to provide a geographic location for the mobile phone 100. It may be understood that the positioning apparatus 108 may be specifically a receiver of a positioning system such as a Global Positioning System (global positioning system, GPS) or a BeiDou Navigation Satellite System. After receiving a geographic location sent by the positioning system, the positioning apparatus 108 sends the information to the processor 101 for processing, or sends the information to the memory 103 for storage. In some other embodiments, the positioning apparatus 108 may be a receiver of an Assisted Global Positioning System (assisted global positioning system, AGPS). The AGPS is a running manner of performing GPS positioning with specific assistance. The AGPS may enable positioning of the mobile phone 100 to be faster by using a signal of the base station in combination with a GPS satellite signal. In the AGPS system, the positioning apparatus 108 may obtain positioning assistance by communicating with an assisted positioning server (for example, a mobile phone positioning server). The AGPS system is used as an assisted server to assist the positioning apparatus 108 in completing ranging and positioning services. In this case, the assisted positioning server provides positioning assistance by communicating with the positioning apparatus 108 (namely, a receiver of the GPS) of the electronic device such as the mobile phone 100 by using a wireless communications network. In some other embodiments, the positioning apparatus 108 may alternatively be a positioning technology that is based on a Wi-Fi access point. Each Wi-Fi access point has a globally unique MAC address, and the electronic device can scan and collect a broadcast signal of a surrounding Wi-Fi access point when Wi-Fi is enabled. Therefore, the electronic device can obtain a MAC address that is broadcast by the Wi-Fi access point. The electronic device sends such data (for example, the MAC address) that can identify the Wi-Fi access point to a location server by using the wireless communications network. The location server retrieves a geographic location of each Wi-Fi access point, calculates a geographic location of the electronic device with reference to strength of a Wi-Fi broadcast signal, and sends the geographic location of the electronic device to the positioning apparatus 108 of the electronic device.

The audio frequency circuit 109, a loudspeaker 113, and a microphone 114 may provide an audio interface between the user and the mobile phone 100. The audio frequency circuit 109 may transmit, to the loudspeaker 113, an electrical signal converted from received audio data, and the loudspeaker 113 converts the electrical signal into a sound signal for outputting. In addition, the microphone 114 converts a collected sound signal into an electrical signal, and the audio frequency circuit 109 converts the electrical signal into audio data after receiving the electrical signal, and then outputs the audio data to the RF circuit 102 to send the audio data to, for example, another mobile phone, or outputs the audio data to the memory 103 for further processing.

The peripheral interface 110 is configured to provide various interfaces for external input/output devices (such as a keyboard, a mouse, a display externally connected to the mobile phone 100, an external memory, and a subscriber identity module card). For example, the mobile phone 100 is connected to the mouse by using a Universal Serial Bus interface, and is electrically connected, by using a metal contact on a card slot of the subscriber identity module card, to the subscriber identity module (subscriber identity module, SIM) card provided by a telecommunications operator. The peripheral interface 110 may be configured to couple the external input/output peripheral devices to the processor 101 and the memory 103.

The mobile phone 100 may further include the power supply apparatus 111 (for example, a battery and a Power Management IC) that supplies power to the components. The battery may be logically connected to the processor 101 by using the Power Management IC, so that functions such as charging management, discharging management, and power consumption management are implemented by using the power supply apparatus 111.

Although not shown in FIG. 1, the mobile phone 100 may further include a camera (a front-facing camera 1101 shown in FIG. 11 or a rear-facing camera), a camera flash, a micro projection apparatus, a Near Field Communication (near field communication, NFC) apparatus, and the like. Details are not described herein. FIG. 11 is an example main view of the mobile phone 100. In FIG. 11, the mobile phone 100 may further include the front-facing camera 1101, the ambient light sensor 1102, the proximity sensor 1103, a power button 1104, a fingerprint button 1105 (on which the fingerprint recognizer 112 is configured), an earpiece 1106, a return key 1107, and a multitasking menu key 1108. The fingerprint recognizer 112 may be configured on the fingerprint button 1105. After a finger of the user presses the fingerprint button 1105, the mobile phone 100 may perform fingerprint verification, authentication, or the like by using a fingerprint collected by the fingerprint recognizer.

For example, the memory 103 of the mobile phone 100 may store the Android® operating system, and the operating system is a Linux-based mobile device operating system, and implements various functions in combination with the foregoing hardware in the mobile phone 100. A software architecture of the stored Android® operating system is described below in detail. It should be noted that in the embodiments of this application, the Android® operating system is merely used as an example to describe a software environment required for implementing, by the electronic device, the technical solutions of the embodiments. A person skilled in the art may understand that the embodiments of this application may also be implemented by using another operating system.

Figure 2:
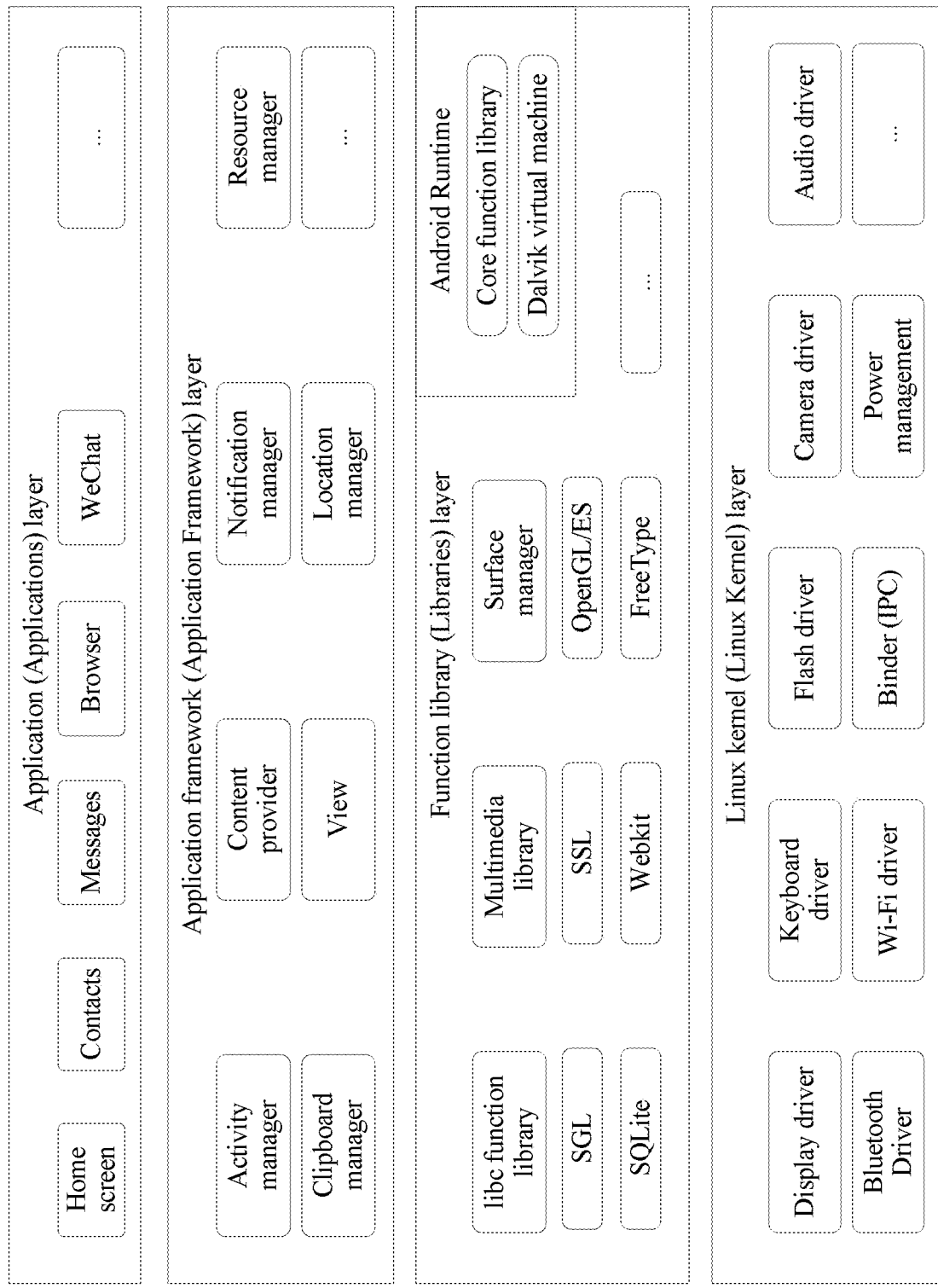
FIG. 2 is a schematic diagram of a software architecture of an ANDROID® operating system according to some embodiments.

For example, FIG. 2 is a schematic diagram of a software architecture of an Android® operating system that can run on the foregoing electronic device. The software architecture may be divided into four layers: an application layer, an application framework layer, a function library layer, and a Linux kernel layer.

1. Application (Applications) Layer

The application layer is an uppermost layer of the operating system, and includes native applications in the operating system, such as an email client, Messages, Phone, Calendar, Browser, and Contacts. Certainly, a developer may compile an application, and install the application at the layer. The application is usually developed by using a Java language, and this is completed by invoking an application programming interface (application programming interface, API) provided by the application framework layer.

2. Application Framework (Application Framework) Layer

The application framework layer mainly provides the developer with various APIs that may be used to access an application. The developer may interact with a bottom layer (for example, a function library or a Linux kernel) of the operating system by using an application framework, to develop an own application. The application framework mainly includes a series of services and management systems of the Android operating system. The application framework mainly includes the following basic services:

An activity manager (Activity Manager) is used to manage a life cycle of an application, and provide a commonly-used navigation back function;
a content provider (Content Providers) is used to manage data sharing and access between different applications;
a notification manager (Notification Manager) is used to control an application to display prompt information (for example, an alert (Alerts) or a notification (Notifications)) on a status bar, a lock screen interface, or the like to a user;
a resource manager (Resource Manager) provides a non-code resource (for example, a character string, a graph, or a layout file (Layout file)) for an application for use;
a clipboard manager (Clipboard Manager) mainly provides a copying or pasting function inside an application or between applications;
a view (View) has abundant and extensible view sets, may be used to construct an application, and specifically includes a list (List), a grid (Grid), a text box (Text Box), a button (Button), and an embeddable web browser; and
a location manager (Location Manager) mainly enables an application to access a geographic location of the electronic device.

3. Function Library (Libraries) Layer

The function library layer is a support of the application framework, and is an important link that connects the application framework layer and the Linux kernel layer. The function library layer includes some function libraries compiled by using a computer programming language C or C++. These function libraries can be used by different components in the operating system, and provide services for the developer by using the application framework layer. Specifically, the function libraries may include a libc function library, and the libc function library is specially customized for a device that is based on embedded Linux. The function libraries may further include a multimedia library (Media Framework), and the library supports playback and recording of audio or videos in a plurality of encoding formats, and also supports a still image file and a common audio or video encoding format. The function libraries further include an interface management library (Surface Manager). The interface management library is mainly responsible for managing access to a display system, is specifically used to be responsible for managing interaction between a display operation and an access operation when a plurality of applications are executed, and is further responsible for display composition of a 2D drawing and a 3D drawing.

The function library layer may further include other function libraries used to implement functions of a mobile phone, such as an SGL (Scalable Graphics Library) that is an XML (Extensible Markup Language) file-based 2D graph and image processing engine; an SSL (Secure Sockets Layer) that is located between a TVP/IP protocol and various application layer protocols, to provide a support for data communication; OpenGL/ES that supports a 3D effect; SQLite that is a relational database engine; Webkit that is a web browser engine; and FreeType that supports a bitmap and a vector font.

Android Runtime is a runtime environment in the Android® operating system, and is a new virtual machine used in the Android® operating system. An AOT (Ahead-Of-Time) technology is used in Android Runtime. When an application is installed for a first time, a bytecode of the application is precompiled into a machine code, so that the application becomes a real local application. Then, a compilation step is omitted when the application runs again, so that both starting and execution become faster.

In some other embodiments of this application, Android Runtime may alternatively be replaced with a core function library (Core Libraries) and a Dalvik virtual machine (Dalvik Virtual Machine). The core function library provides most functions of an API in the Java language, and mainly provides, for the application framework layer in a Java Native Interface (Java native interface, JNI) manner, an interface for invoking a bottom-layer program library. In addition, the core function library further includes some core APIs of the operating system, such as android.os, android.net, and android.media. The Dalvik virtual machine uses a JIT (Just-in-Time) runtime compilation mechanism. The virtual machine needs to recompile a bytecode on the background each time a process is started, and this affects a starting speed. Each application runs in one Dalvik virtual machine instance, and each Dalvik virtual machine instance is independent process space. The Dalvik virtual machine is designed to enable a plurality of virtual machines to run in one device efficiently. The Dalvik virtual machine may execute a file format .dex. The dex format is a compression format specially designed for Dalvik, and is suitable for a system having limited memory and a limited processor speed. It should be noted that, the Dalvik virtual machine depends on the Linux kernel to provide a basic function (thread and bottom-layer memory management). It may be understood that Android Runtime and Dalvik belong to different types of virtual machines, and a person skilled in the art may select different forms of virtual machines in different cases.

4. Linux Kernel (Linux Kernel) Layer

The layer provides a core system service of the operating system. For example, security, memory management, process management, a network protocol stack, and a driver model are all based on the Linux kernel. The Linux kernel is also used as an abstract layer between hardware and a software stack. The layer has many drivers related to a mobile device, and has the following main drivers: a display driver, a Linux-based frame buffer driver, a keyboard driver that is used as an input device, a flash driver that is based on a memory technology device, a camera driver, an audio driver, a Bluetooth driver, a Wi-Fi driver, and the like.

All the technical solutions in the following embodiments may be implemented on an electronic device (for example, the mobile phone 100) that has the foregoing hardware architecture and software architecture.

Figure 3:
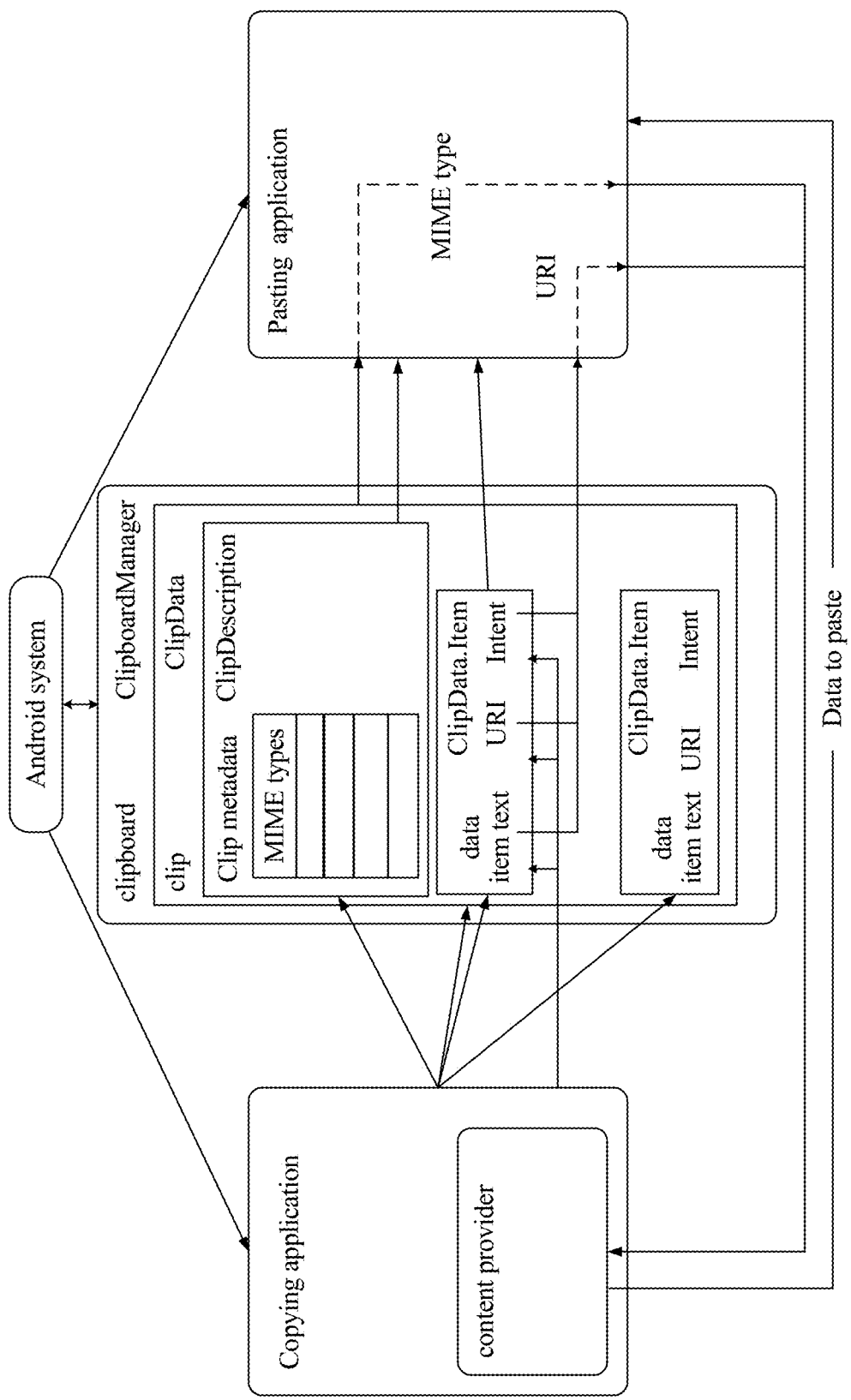
FIG. 3 is a schematic diagram of a software architecture of copying and pasting functions of an ANDROID® operating system according to some embodiments.

For example, as shown in FIG. 3, FIG. 3 shows an architecture of a clipboard of the Android® operating system stored in the memory 103. In the figure, ClipboardManager is a global clipboard (also referred to as a cutting board) of the system, and may be obtained by using a function getSystemService(CLIPBOARD SERVICE). The electronic device manages data copying or pasting between two applications or inside an application by using ClipboardManager. ClipData is a clip object, and includes data description information and the data. There is only one ClipData object in the clipboard each time. The clipboard does not store a previous clip object when another clip object is obtained. One clip object may include one or more ClipData.Item objects and one ClipDescription object. The ClipDescription object includes clip-related metadata (Clip metadata). An item may be added to the clip object by using a function addItem(ClipData.Item item). ClipData.Item is a data type (data item) in the clipboard, and the data type may include a text, a uniform resource identifier (uniform resource identifier, URI), and Intent. A plurality of ClipData.Item objects may be added to one Clip, so that the user may copy a plurality of pieces of selected content as one Clip. For example, if there is a list Widget that allows the user to select a plurality of options at a time, all selected options may be copied into the clipboard at a time.

When copying data, an application (for example, a copying application in FIG. 3) places a ClipData object in the clipboard of ClipboardManager. When pasting the data, another application (for example, a pasting application in FIG. 3) first obtains the ClipData object from the clipboard, and then, reads a Multipurpose Internet Mail Extensions (multipurpose internet mail extensions, MIME) type of the data from the ClipDescription object, and reads the data from the ClipData.Item object or from a content provider to which the ClipData.Item object points.

Figure 4:
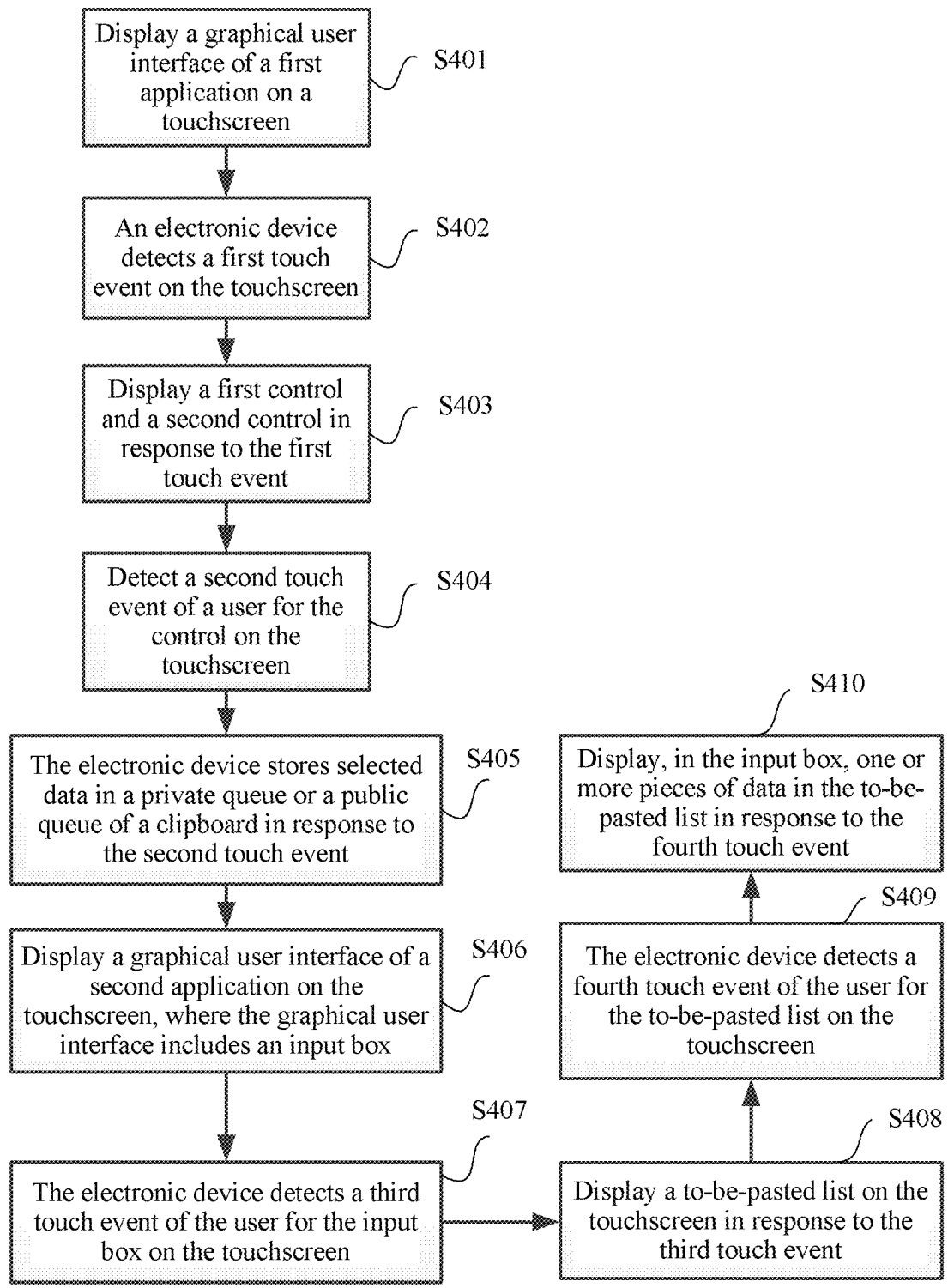
FIG. 4 is a schematic flowchart of a method according to some embodiments of this application.

Based on the electronic device that has the hardware architecture and the software architecture in the foregoing embodiment, for example, as shown in FIG. 4, an embodiment of this application provides a data processing method. The method may be implemented on the electronic device in the foregoing embodiment, and the method may include the following steps.

Figure 5A:
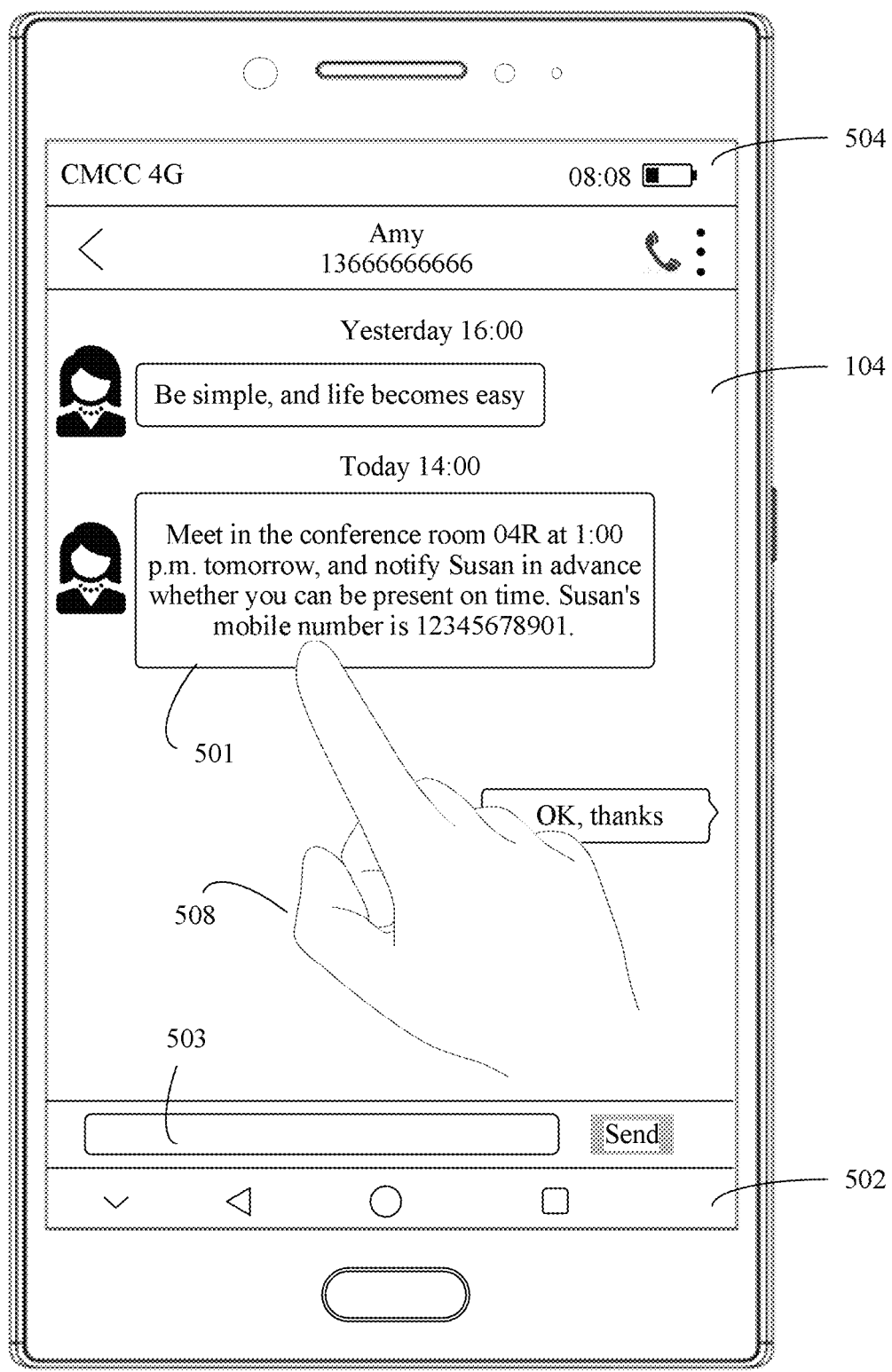
FIG. 5A to FIG. 5E are schematic diagrams of some graphical user interfaces displayed on an electronic device according to some embodiments.

Step S401: Display a graphical user interface (graphical user interface, GUI) of a first application on a touchscreen 104. The GUI includes data that can be copied. For example, the first application may be Messages, and the GUI may be a message dialog interface of Messages. As shown in FIG. 5A, a GUI of Messages is displayed on the touchscreen 104, and a dialog box 501 indicates an SMS message sent by a contact Amy. In addition, an input box 503, a navigation bar 502 that can be hidden, and a status bar 504 may be further displayed on the touchscreen 104. Data such as a text, a URL, a picture, or a video may be entered into the input box 503. The navigation bar 502 is used to perform a quick operation on the GUI displayed on the touchscreen 104, for example, return to a previous interface, return to a home screen, or perform multitasking management. The status bar 504 is used to display basic information such as telecommunications operator information, a battery level, and time on the electronic device, and may further display a notification message, and the like. Data that can be copied in the GUI may be content of the SMS message in the dialog box 501, or may be content of an SMS message in another dialog box.

Step S402: The electronic device detects a first touch event on the touchscreen. For example, the first touch event may be for data in the dialog box 501 in FIG. 5A. The first touch event may be that a finger (or a stylus) of a user touches and holds or heavily presses the touchscreen (namely, a touch and hold gesture or a heavy press gesture). The touch and hold gesture may be specifically that the finger of the user lightly taps the touchscreen and keeps staying on the touchscreen within a preset time. The heavy press gesture may be specifically that the finger of the user lightly taps the touchscreen and applies pressure exceeding a preset threshold to the touchscreen. Alternatively, the first touch event may be that a finger (or a stylus) of a user lightly taps or heavily presses the touchscreen and lifts after the finger quickly or slowly moves for a distance without leaving the touchscreen (namely, a slide gesture). In this embodiment, a specific form of the first touch event is not limited.

Step S403: In response to the first touch event, select data corresponding to the first touch event, and display a first control and a second control on the touchscreen. The first control is used to copy the selected data into a private queue of a clipboard. Data in the private queue may be, for example, first data copied inside the first application. The first data can be pasted only inside the first application, and cannot be pasted in another application. In other words, the another application cannot obtain the first data that is copied from the first application and that is stored in the private queue of the clipboard. The second control is used to copy the selected data in a public queue of the clipboard. Data in the public queue may be, for example, second data copied inside the first application. The second data can be pasted in any application. In other words, any application can obtain the second data that is copied from the first application and that is stored in the public queue. In addition, the data corresponding to the first touch event is selected in response to the first touch event, and both the first control and the second control may be for the selected data. In some other embodiments of this application, the selected data may be highlighted on the touchscreen, so that the selected data is distinguished from other unselected data.

Figure 5B:
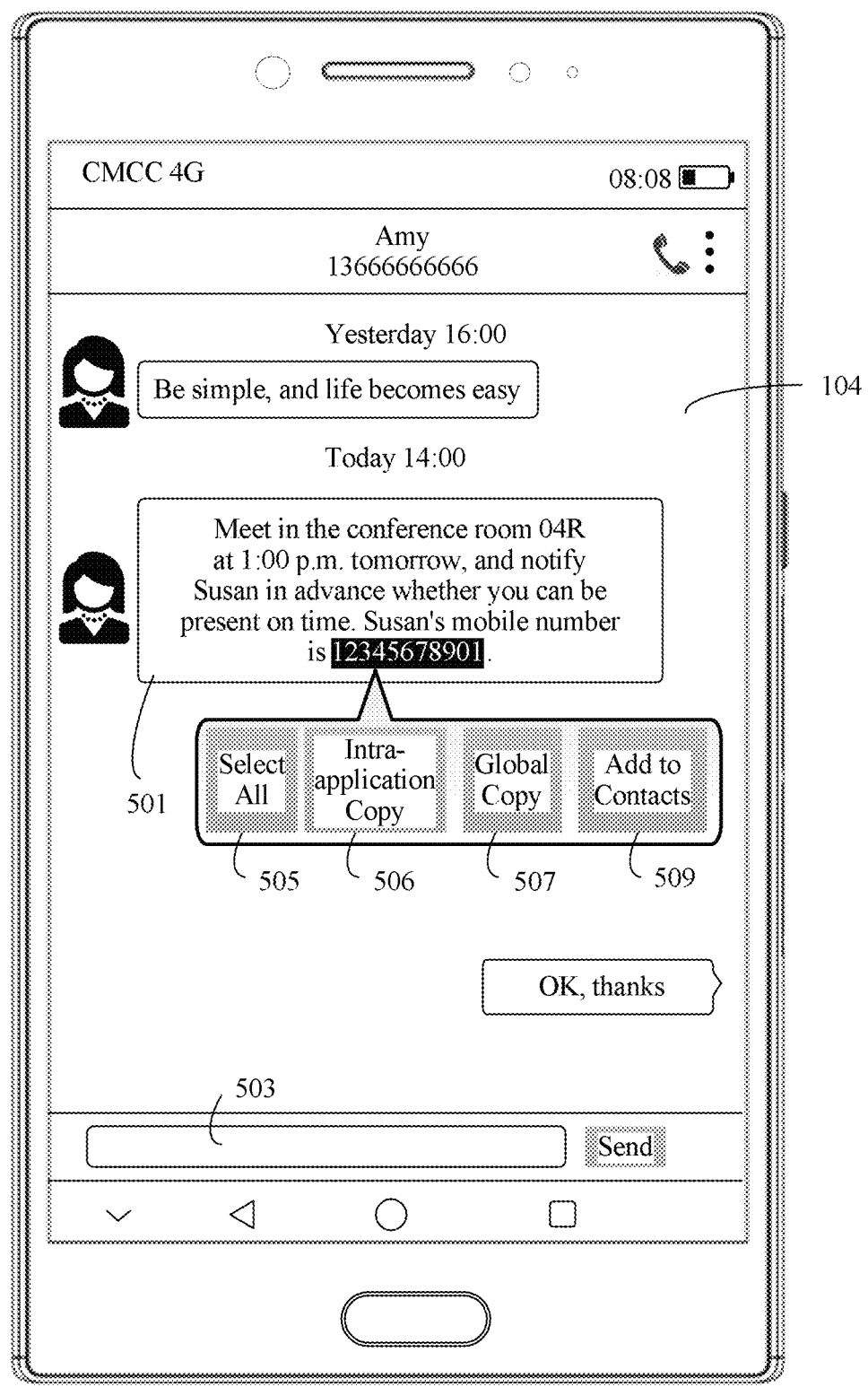

For example, as shown in FIG. 5B, in response to a slide gesture of a finger 508 of the user on the touchscreen, a string of digits "12345678901" is selected, and a plurality of controls such as a control 505, a control 506, a control 507, and a control 509 are displayed on the touchscreen. The control 505 ("Select All") is used to select all content of the SMS message in the dialog box 501. To be specific, after detecting that the finger of the user touches the control, the electronic device may select all the content of the SMS message in the dialog box 501 in response to the touch. The control 506 ("Intra-application Copy") is used to copy the selected data, namely, "12345678901", into the private queue of the clipboard. To be specific, the selected data "12345678901" can be pasted only inside the application Messages. In other words, the electronic device can paste data in an application from which the data is copied. For example, the selected data is copied from the dialog message from the contact Amy, and then the selected data is pasted into an input box of an SMS message dialog with another contact (for example, Tom). The control 507 ("Global Copy") is used to copy the selected data into the public queue of the clipboard. To be specific, the selected data "12345678901" can be pasted in some other applications. The control 509 ("Add to Contacts") is used to add the selected data to a contact way of an existing contact or create a new contact. In some other embodiments of this application, the electronic device may first determine a type of the selected data, and then display the control 509 of different content based on the type of the data. For example, the control 509 may be displayed as a control "Open URL in Browser" when the selected data is a URL; the control 509 may be displayed as the control "Add to Contacts" in the foregoing embodiment when the selected data is a string of digits; and the control 509 may not be displayed on the touchscreen when the selected data is a text. In this embodiment of this application, all functions implemented by the clipboard may be implemented by a clipboard manager in an application framework layer of an Android® system.

It may be understood that the selected data may be various types of data, for example, may be at least one of the following formats: TXT, a URL, a picture, audio, and a video. In some other embodiments of this application, the selected data may be two or more pieces of data.

Step S404: The electronic device detects a second touch event of a user for the control on the touchscreen. For example, the second touch event may be that the finger (or the stylus) of the user lightly taps a location corresponding to the control on the touchscreen (namely, a tap gesture for the control). In this embodiment, a specific form of the second touch event is not limited.

Step S405: The electronic device stores the selected data in a private queue or a public queue of a clipboard in response to the second touch event.

Figure 6:
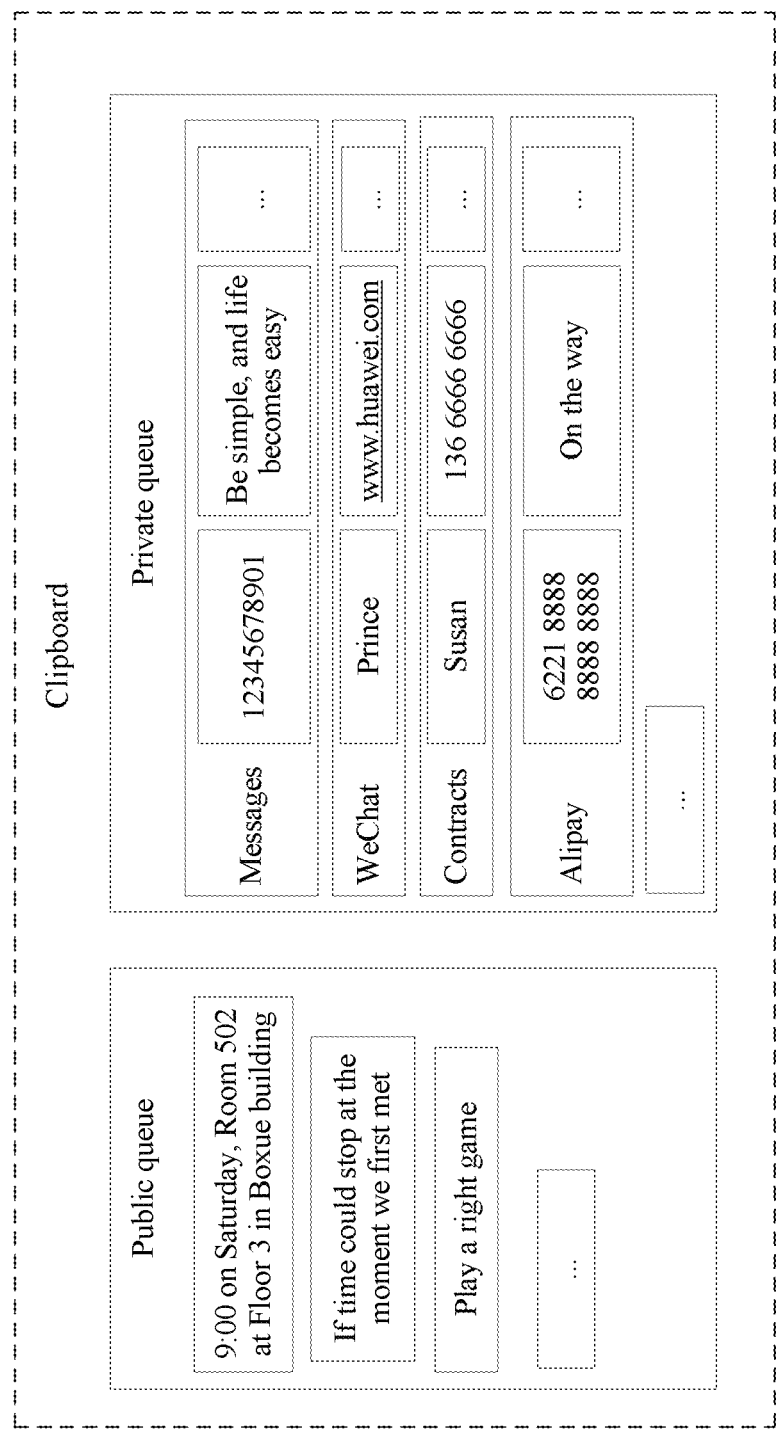
FIG. 6 is a schematic diagram of a clipboard stored in an electronic device according to some embodiments.
Figure 7A:
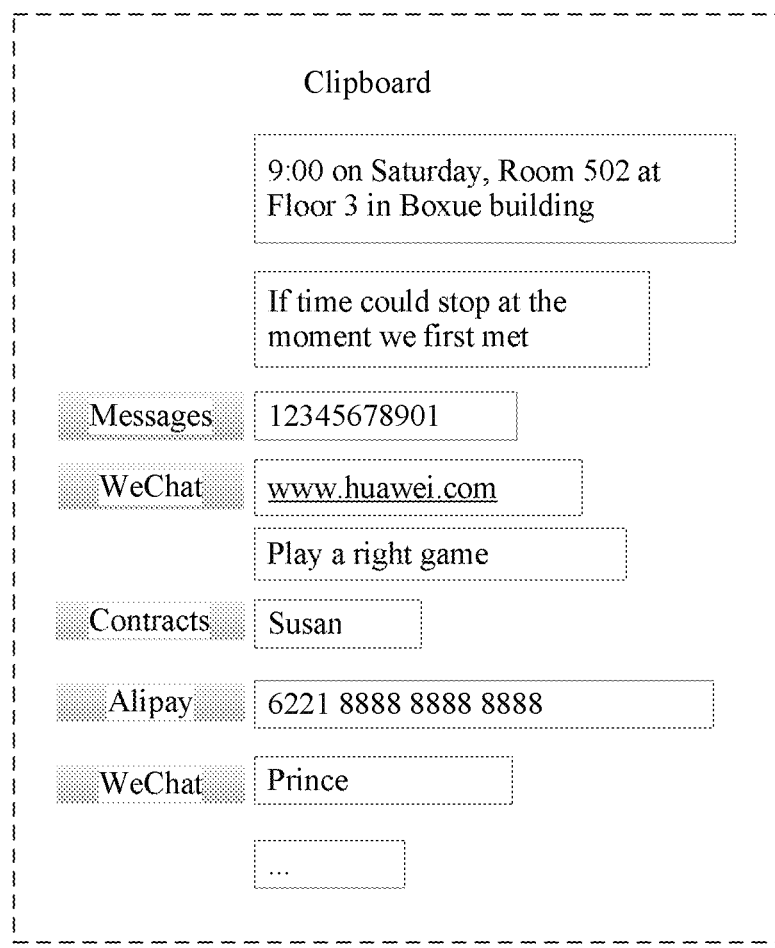
FIG. 7A and FIG. 7B are schematic diagrams of clipboards stored in an electronic device according to some other embodiments.

The public queue of the clipboard is used to store the copied data, and the copied data can be pasted in any application. In addition, an application from which the data in the public queue comes may not be marked, or a source from which the data in the public queue is copied may be marked. The private queue of the clipboard is used to store the copied data, each piece of copied data has a source identifier of an application corresponding to the piece of copied data (in other words, an application from which the data in the private queue comes is marked), and the data can be pasted only inside the application corresponding to the data. For example, FIG. 6 shows data stored in the clipboard. The public queue stores some copied data, and all the data can be pasted in any application. The private queue stores some other data, and the data can be pasted only in corresponding applications of the data. It may be understood that the chipboard shown in FIG. 6 merely describes an example of the technical solution in this embodiment of this application. In some other embodiments of this application, as shown in FIG. 7A, there may be no private queue or public queue in the chipboard, and all copied data is in one queue. In FIG. 7A, some copied data can be marked, indicating that the copied data can be pasted only in a corresponding application; and some data is not marked, indicating that the data can be pasted in any application.

In some embodiments of this application, a clipboard queue (for example, a public queue or a private queue) may be added to the foregoing ClipboardManager, the electronic device may store all historical copied data, and the user may select latest copied data by default for pasting.

In some embodiments of this application, the public queue of the clipboard may be defined by using the following function:

private final SparseArray<ClipData>mPublicClipDatas=new SparseArray< >( ).

The foregoing defines pseudocode of the public queue. When the user selects "Global Copy", the electronic device stores the copied data in the public queue by using the function.

In some embodiments of this application, the private queue of the clipboard may be defined by using the following function:

private final HashMap<String, SparseArray<ClipData>>mPrivateClipDatas=new HashMap< >( ).

The foregoing defines pseudocode of the private queue, where String corresponds to a package name of each application and is used to indicate a different application. In the function SparseArray<ClipData>, Array stores a private queue corresponding to an application. The selected data is stored in the queue when the user selects "Intra-application Copy".

In some embodiments of this application, step S404 may be specifically as follows: The electronic device detects a second touch event of the user for the first control on the touchscreen. Therefore, step S405 may be specifically as follows: The electronic device stores the selected data in the private queue of the clipboard in response to the second touch event for the first control. When another person views a mobile phone of the user, especially views a clipboard of the mobile phone, the person cannot view data in the private queue. In this way, user privacy is protected. In some other embodiments of this application, step S404 may alternatively be specifically as follows: The electronic device detects a second touch event of the user for the second control on the touchscreen. Therefore, step S405 may be specifically as follows: The electronic device stores the selected data in the public queue of the clipboard in response to the second touch event for the second control.

Step S406: Display a graphical user interface of a second application (a second APP) on the touchscreen, where the graphical user interface includes an input box.

Step S407: The electronic device detects a third touch event of the user for the input box on the touchscreen. For example, the third touch event may be that the finger (or the stylus) of the user touches and holds or heavily presses a location corresponding to the input box on the touchscreen (namely, a touch and hold gesture or a heavy press gesture for the input box). In this embodiment, a specific form of the third touch event is not limited.

Step S408: Display a to-be-pasted list on the touchscreen in response to the third touch event, where the to-be-pasted list may include two or more pieces of data. All the data is data stored in the clipboard. The data may come from the public queue of the clipboard, or may come from the private queue of the clipboard.

In some embodiments of this application, step S408 may specifically include steps S408-1 to S408-3.

Step S408-1: In response to the third touch event, the electronic device determines the second App corresponding to the third touch event. In some embodiments, the electronic device may determine, based on the input box, the second App corresponding to the input box. For example, the input box is a search input box in a GUI of Facebook. Because the third touch event is for the search input box, the electronic device can determine that a second App corresponding to the search input box is Facebook. In some other embodiments, the electronic device may alternatively determine, based on a currently displayed GUI, an App corresponding to the currently displayed GUI. For example, if the third touch event is performed for an input box in a currently displayed GUI of Twitter, the electronic device can determine that a second App corresponding to the GUI (including the input box) is Twitter.

Step S408-2: The electronic device determines the to-be-pasted list based on the determined App and data stored in the clipboard.

The data in the to-be-pasted list may come from the public queue of the clipboard, or may come from the private queue of the clipboard. In other words, the to-be-pasted list may include all data in the public queue of the clipboard and data from the determined second App in the private queue of the clipboard. For example, if the determined second App is Messages, the electronic device may first determine first data in the public queue of the clipboard, where the first data is in the public queue and therefore the to-be-pasted list certainly displays the data; and then the electronic device may determine second data from Messages in the private queue of the clipboard. The electronic device may determine the to-be-pasted list based on the first data and the second data, in other words, determine data specifically included in the to-be-pasted data.

Step S408-3: Display the to-be-pasted list on the touchscreen. Specifically, the to-be-pasted list may be displayed above or below the input box.

In some other embodiments of this application, the to-be-pasted list displays the data and an application identifier corresponding to the data. For example, if the to-be-pasted list displays data "13612345678 (Messages)", it indicates that copied data is "13612345678", and an application identifier (which may be understood as an application name) corresponding to the data is "Messages", in other words, the data is copied from Messages. In this way, the user very easily knows an application from which the data in the to-be-pasted list respectively comes. This further facilitates user operations and improves user experience.

It may be understood that in the embodiments of this application, the term "list" only indicates that there are a plurality of pieces of copied data or to-be-pasted data. The term does not indicate that the data is necessarily stored or presented in a form of a list. For example, the to-be-pasted data may alternatively be displayed above or below the input box in a form of an irregular bubble. A person skilled in the art may know that a plurality of pieces of data in the clipboard may be specifically stored and presented in a plurality of manners. The manners may include but are not limited to the form of the list.

Step S409: The electronic device detects a fourth touch event of the user for the to-be-pasted list on the touchscreen. For example, the fourth touch event may be that the finger (or the stylus) of the user lightly taps a location corresponding to the to-be-pasted list on the touchscreen (namely, a tap gesture for the to-be-pasted list). In this embodiment, a specific form of the fourth touch event is not limited.

Step S410: Display, in the input box, one or more pieces of data in the to-be-pasted list in response to the fourth touch event.

The fourth touch event is for the one or more pieces of data in the to-be-pasted list (for one or more rows of data in FIG. 5A to FIG. 5E), and indicates that the user needs to display, in the input box, a piece of data in the to-be-pasted list, to help the user to perform a subsequent operation. Step S409 is a step of pasting and displaying the data selected in response to the fourth touch event. It may be understood that step S409 may further include that the to-be-pasted list is no longer displayed on the touchscreen. In some embodiments of this application, the to-be-pasted list may be displayed above the input box.

Figure 5C:
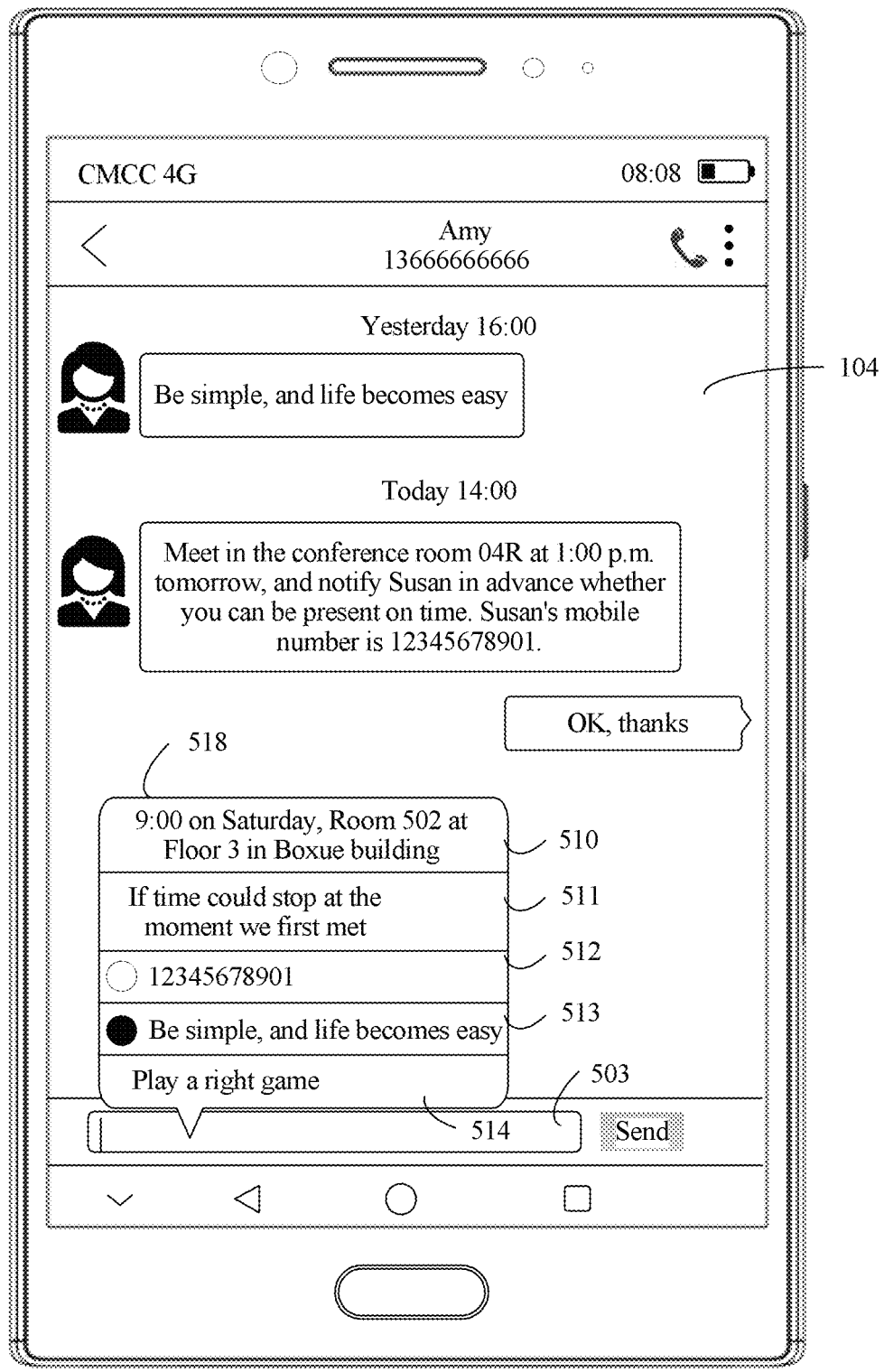
Figure 5D:
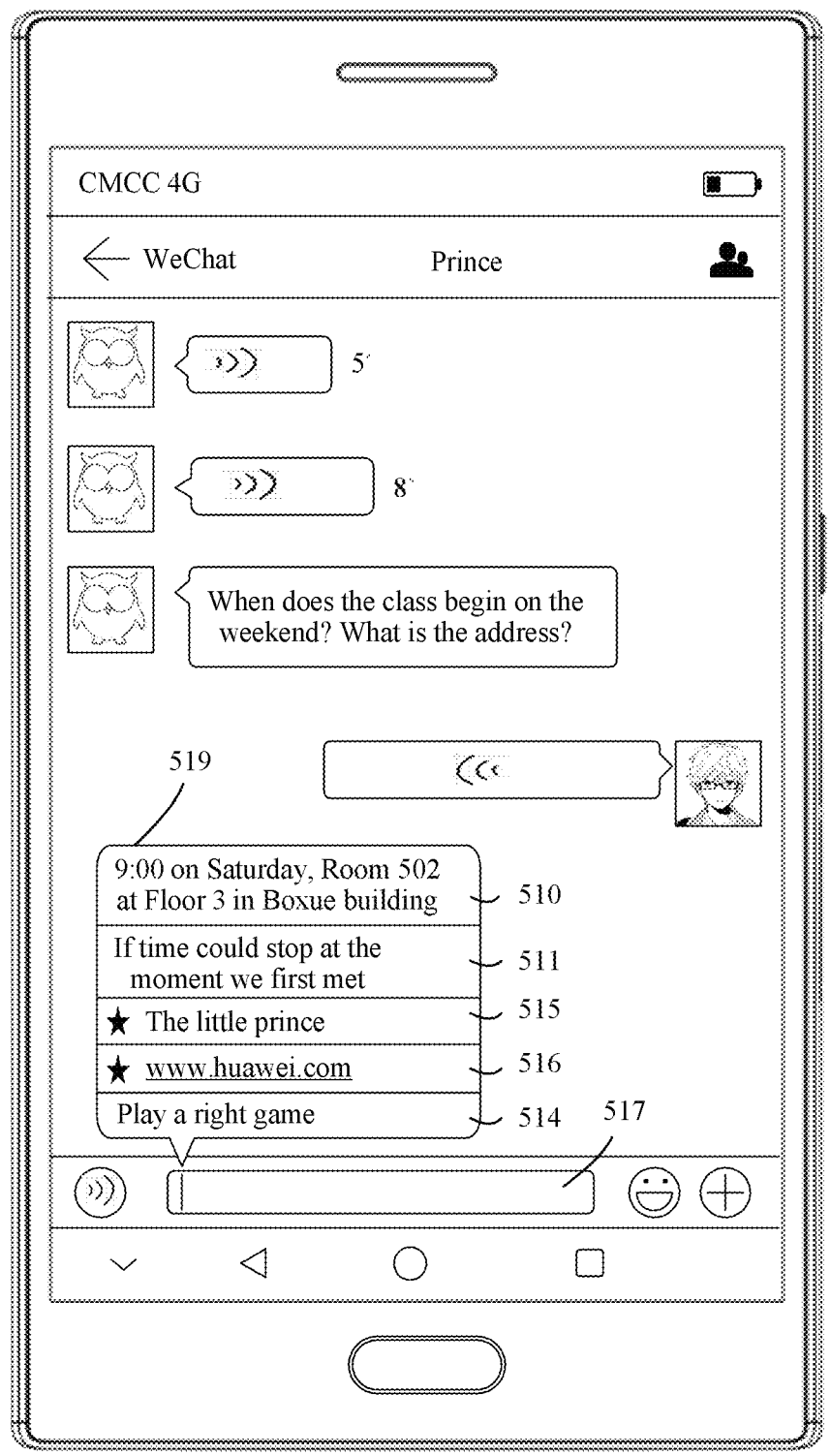
Figure 5E:
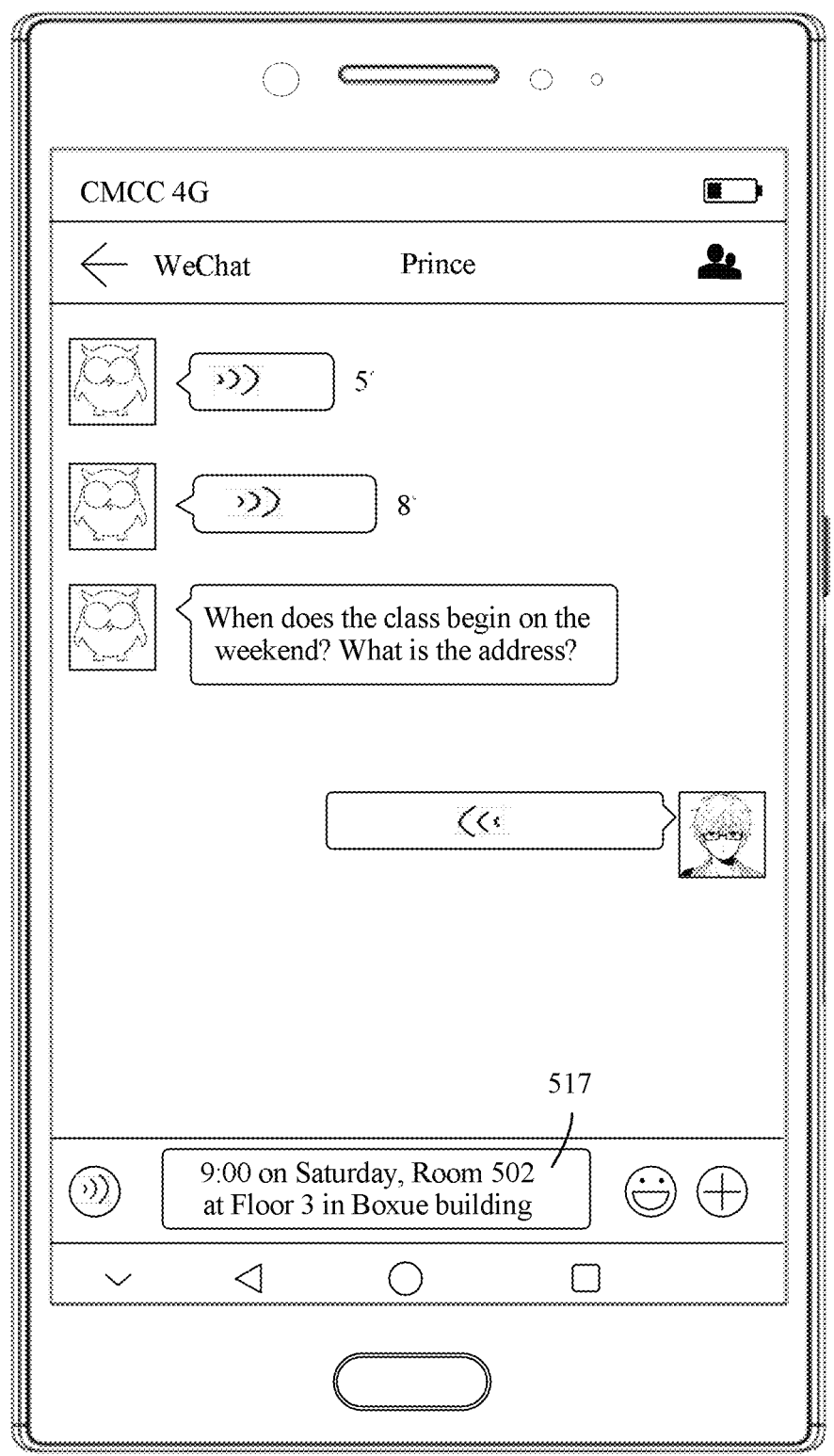
Figure 7B:
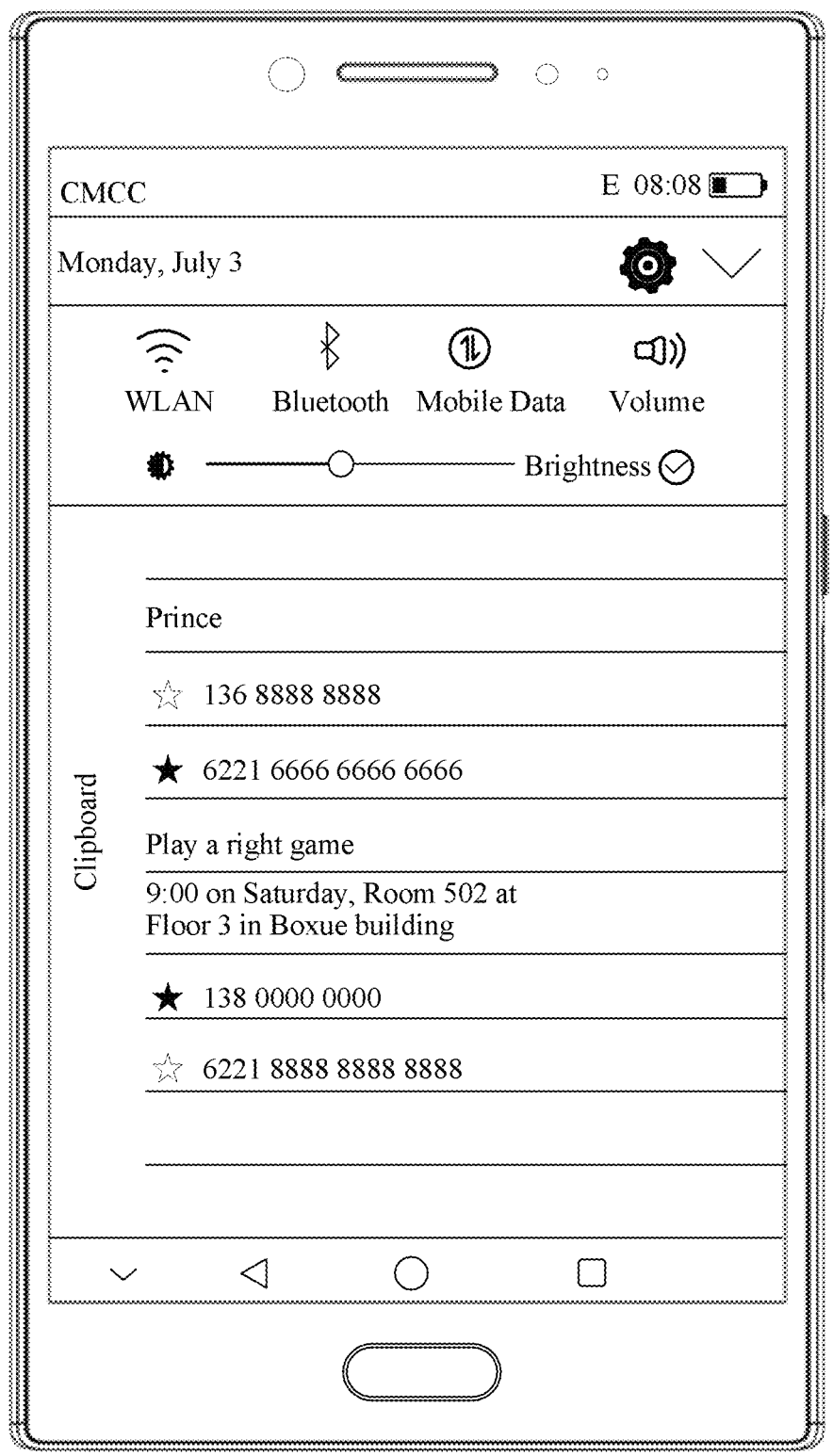

To clearly describe the technical solutions in the foregoing embodiment, FIG. 5A to FIG. 5E are used as an example for specific description herein. For example, in FIG. 5B, after the finger of the user touches the control 506, the electronic device stores the selected data "12345678901" in the private queue of the clipboard in response to the touch operation. With reference to FIG. 6, as shown in FIG. 5C, a to-be-pasted list, namely, rows of data in the clipboard, is displayed on the touchscreen when the user pastes data in the clipboard in the input box 503 of Messages. Some data such as data 510, data 511, and data 514 comes from the public queue of the clipboard, and some data such as data 512 and data 513 comes from the private queue of the clipboard. Because the data 512 and the data 513 are data from Messages in the private queue of the clipboard, the data can be pasted only in the application Messages, and the data in the private queue can be displayed in the to-be-pasted list. As shown in FIG. 5D, the GUI is a message dialog interface of WeChat. When the user pastes data in the clipboard in an input box 517 of WeChat, a to-be-pasted list is displayed on the touchscreen. Some data such as data 510, data 511, and data 514 comes from the public queue of the clipboard, and data 515 and data 516 are WeChat-related data from the private queue of the clipboard, in other words, the data 515 and the data 516 are copied from WeChat, and the data is allowed to be pasted only in WeChat. With reference to FIG. 6, it can be learned, by comparing FIG. 5C and FIG. 5D, that data in the public queue may be displayed in an application such as WeChat or Messages, but copied data belonging to WeChat in the private queue can be displayed only in WeChat and is not displayed in Messages, and copied data belonging to Messages in the private queue can be displayed only in Messages; in other words, data in the private queue can be displayed only in an application corresponding to the data. As shown in FIG. 5E, the electronic device detects a fourth touch event of the finger of the user for the data 510 in the to-be-pasted list on the touchscreen; and the electronic device may display the data 510 in the input box 517 of WeChat in response to the fourth touch event. The fourth touch event may be a gesture of lightly tapping the touchscreen, and indicates that the user selects the one or more pieces of data in the to-be-pasted list. The electronic device displays the data selected by the user in the input box 517. It may be understood that the chipboard shown in FIG. 6 merely describes an example of the technical solution in this embodiment of this application. In some other embodiments of this application, as shown in FIG. 7A, there may be no private queue or public queue in the chipboard, and all copied data is in one queue. In FIG. 7A, some copied data can be marked, indicating that the copied data can be pasted only in a corresponding application; and some data is not marked, indicating that the data can be pasted in any application. In some other embodiments of this application, for example, as shown in FIG. 7B, a drop-down notification bar may be displayed after the user makes a drop-down gesture on the status bar on the touchscreen, and data in the clipboard may be displayed in the notification bar. In FIG. 7B, the notification bar may display some data in the clipboard, or may display all the data in the clipboard. In addition, to enhance data security, the notification bar may display only data in the public queue of the clipboard, and does not display data in the private queue. In some other embodiments of this application, the electronic device may further mark data from different applications differently, to help the user to distinguish between the data. In some other embodiments of this application, after the user taps a piece of data in the clipboard, the electronic device may search for the data in response to the tap event. For example, if the user taps "The little prince" in FIG. 7B, the electronic device may start a browser, search an application or the Internet by using "The little prince" as a search keyword, and display a search result in the browser.

According to the technical solutions of this embodiment, the electronic device may process copied data and pasted data more intelligently, and may intelligently provide a to-be-pasted list based on different data sources. In this way, transaction processing efficiency of the electronic device is further improved, and user experience is also improved.

In some other embodiments of this application, when the user needs to open the clipboard to view the copied data, the data stored in the private queue of the clipboard may not be displayed, and only the data in the public queue is displayed. In this way, disclosure of private data of the user can be avoided.

In some other embodiments of this application, the data in the to-be-pasted list may be arranged based on a copying time sequence of all the data. For example, the latest copied data 510 may be displayed in a first row, and the earliest copied data 514 may be displayed in a last row.

In some other embodiments of this application, the electronic device may mark the data from the public queue of the clipboard or the data from the private queue of the clipboard differently. For example, as shown in FIG. 5C, in a to-be-pasted list 518, data 512 and data 513 from the private queue are marked with circles, to give, to the user, a prompt that the data comes from Messages; and as shown FIG. 5D, in a to-be-pasted list 519, data 515 and data 516 from the private queue are marked with stars, to give, to the user, a prompt that the data comes from WeChat. In this way, processing efficiency of the electronic device can be further improved, and user experience is also improved. In some other embodiments of this application, the electronic device may further mark data from the clipboard with different colors, to give a prompt to the user. For example, the data from the public queue may be marked with blue, and the data from the private queue is marked with red. In addition, data from different applications in the private queue may further be displayed differently. For example, the data 515 in the private queue comes from WeChat, and may be marked with green or marked with a color that is the same as or similar to that of an icon of WeChat.

In some other embodiments of this application, after step S410, the method may further include step S411: After displaying the data corresponding to the fourth touch event in the input box, the electronic device can erase the data stored in the clipboard. In this way, storage space of the electronic device can be saved.

To enhance data security, some applications installed in the electronic device may impose a limitation, to prevent data stored in the applications from being copied or pasted into other applications. In other words, the data in the applications can be stored only in the private queue of the clipboard, and cannot be stored in the public queue of clipboard. Therefore, in some embodiments of this application, the electronic device may obtain the limitation condition when starting such an application. When the electronic device detects a touch event of the finger of the user in a GUI of the application, in response to the touch event, the electronic device may display the first control (for example, the control 506 in FIG. 5B), and does not display the second control (for example, the control 507 in FIG. 5B). In some other embodiments of this application, in response to the touch event, the electronic device may display both the first control (for example, the control 506 in FIG. 5B) and the second control (for example, the control 507 in FIG. 5B), but gray-scale processing (for example, Gaussian blur) may be performed on the second control, to give, to the user, a prompt that data in the application cannot be copied or pasted into another application.

In some other embodiments of this application, a prompt box may pop up on the touchscreen when the electronic device displays the GUI related to the application. Content of the prompt box may be "data in the application is protected and cannot be copied into another application", or the like. The prompt box is used to give, to the user, a prompt that only intra-application copying can be performed on the data in the application, and global copying cannot be performed on the data in the application.

Figure 8:
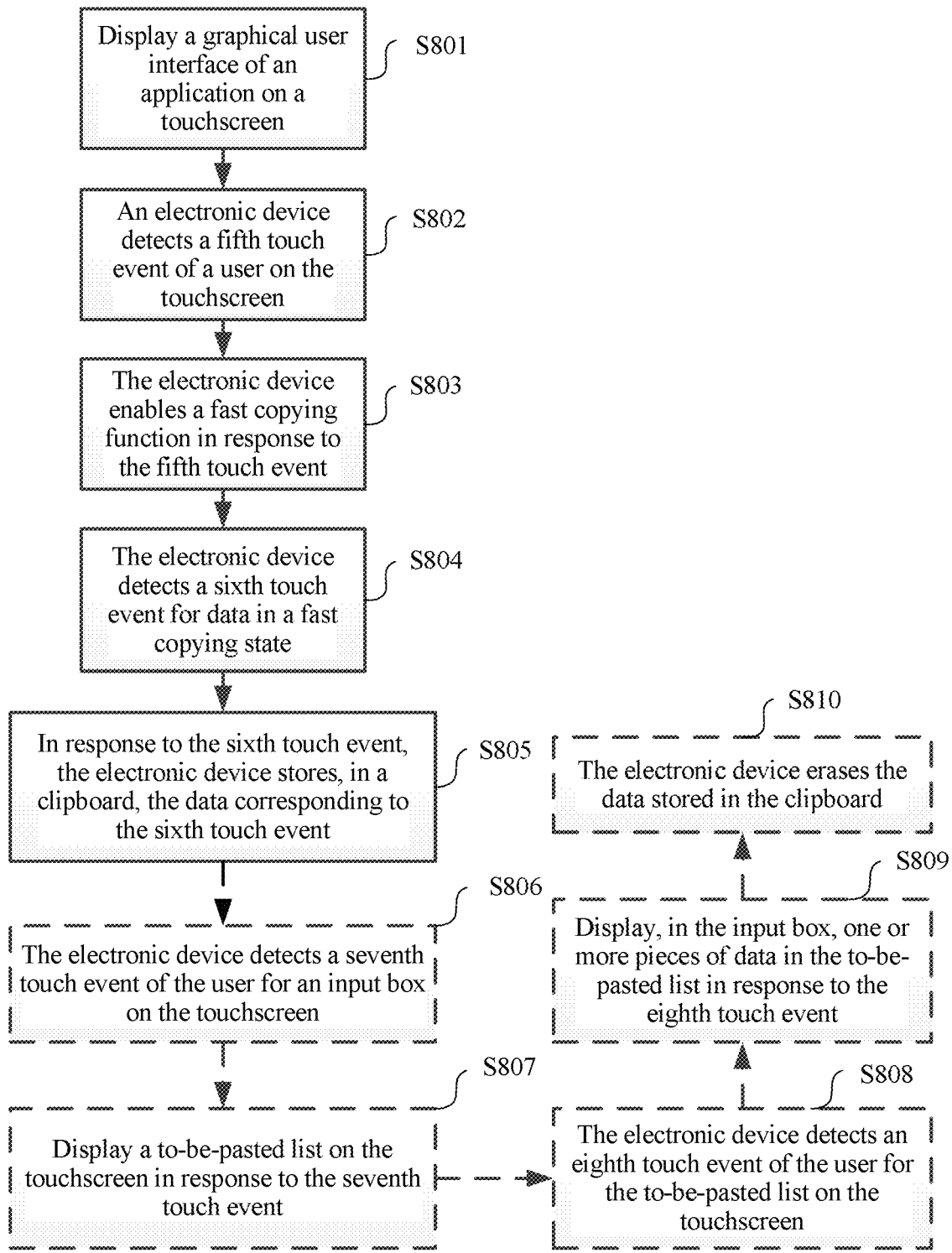
FIG. 8 is a schematic flowchart of a method according to some other embodiments of this application.

FIG. 8 is a schematic flowchart of a fast data copying method according to another embodiment of this application. The method may be implemented on an electronic device having a touchscreen, and the method may specifically include the following steps.

Step S801: Display a graphical user interface (namely, GUI) of an application on a touchscreen, where the GUI includes data such as a text.

Step S802: The electronic device detects a fifth touch event of a user on the touchscreen. The fifth touch event may be for a control in the GUI, or may be a slide gesture on the touchscreen, or the like.

Step S803: The electronic device enables a fast copying function in response to the fifth touch event. The fast copying function may enable the data in the GUI to be in a fast copying state.

Specifically, the electronic device may determine, based on the fifth touch event, an instruction for enabling the data to be in the fast copying state, and then invoke the instruction, to enable the data in the GUI to be in the fast copying state. The fast copying state may specifically mean that the data may be continuously selected by the user for a plurality of times and stored in a clipboard. In this step, that the data in the GUI is in the fast copying state may further be presented visually or acoustically, to give, to the user, a prompt that the user can perform a copying operation. For example, the data in the fast copying state is displayed on the touchscreen in full screen, through jittering, or through magnification. In some embodiments of this application, the fifth touch event may be a double tap event that a finger of the user double taps the touchscreen, or may be a knock event that a knuckle of the user knocks the touchscreen. In this embodiment, a specific form of the fifth touch event is not limited.

Step S804: The electronic device detects a sixth touch event for the data in a fast copying state. The sixth touch event may be specifically a slide gesture generated after the finger (or a stylus) of the user lightly taps or heavily presses the touchscreen, quickly or slowly moves for a distance without leaving the touchscreen, and then lifts. In this embodiment, a specific form of the sixth touch event is not limited.

Step S805: In response to the sixth touch event, the electronic device stores, in a clipboard, the data corresponding to the sixth touch event.

Figure 9A:
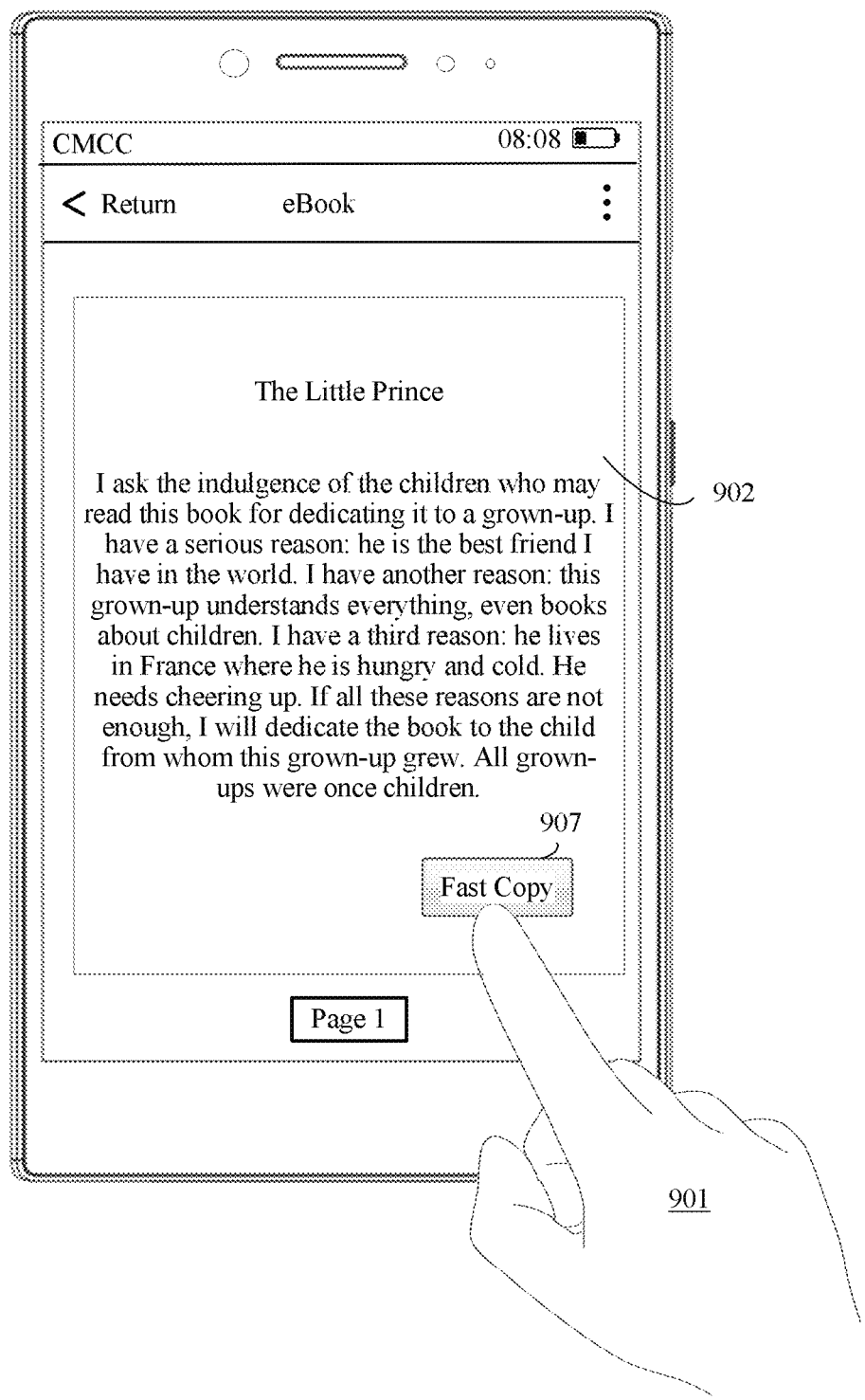
FIG. 9A and FIG. 9B are schematic diagrams of some graphical user interfaces displayed on an electronic device according to some other embodiments of this application.
Figure 9B:
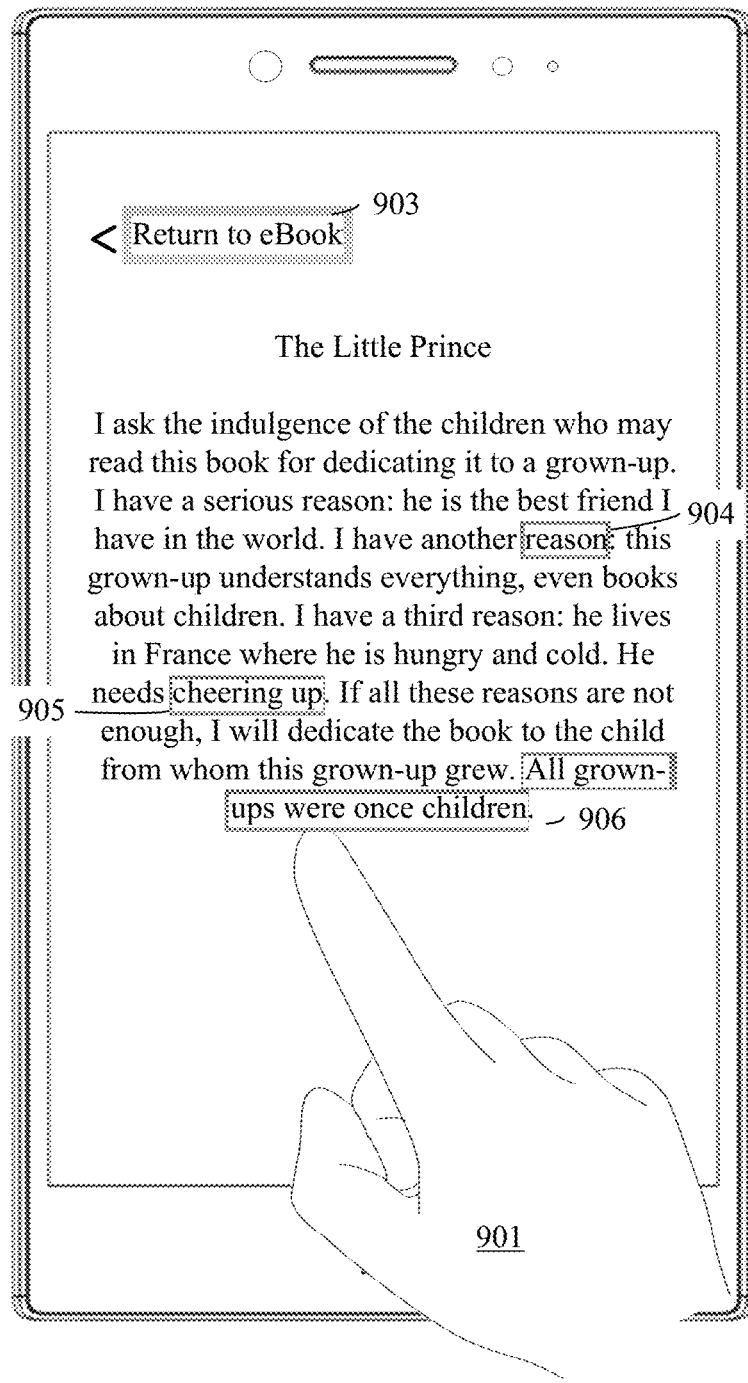

To clearly describe the technical solutions in the foregoing embodiment, FIG. 9A and FIG. 9B are used for specific description herein. For example, as shown in FIG. 9A, a GUI of an application ("eBook") is displayed on the touchscreen. In the interface, data 902 is data in the application. After the electronic device detects a touch event of a finger 901 of the user for the data 902 on the touchscreen, the electronic device enables the data 902 to be in the fast copying state in response to the touch event. For example, the touch event may be that the finger 901 of the user continuously lightly taps the touchscreen twice within a preset time, or may be that the finger 901 of the user heavily presses the touchscreen, where pressure reaches a preset pressure threshold. As shown in FIG. 9B, after the data 902 enters the fast copying state, the data may be displayed on the touchscreen by floating at the interface of the application. In FIG. 9B, the data 902 is in the fast copying state. The electronic device detects a touch operation of the finger 901 of the user for subdata in the data 902 on the touchscreen, and the subdata is copied into the clipboard in response to the touch operation. For example, the touch operation may be an operation performed by the finger 901 of the user on subdata 904, or may be an operation performed by the finger 901 of the user on subdata 905 or subdata 906. The subdata 904, the subdata 905, and the subdata 906 are stored in the clipboard in response to the touch operation. In some embodiments of this application, the touch operation may be specifically a slide gesture of the finger of the user for subdata in the data 902, to select and fast copy the subdata.

According to the foregoing technical solution of implementing fast data copying, efficiency of intelligent interaction between the electronic device and the user is greatly improved, and operation experience of the user during data copying is also improved.

Figure 10A:
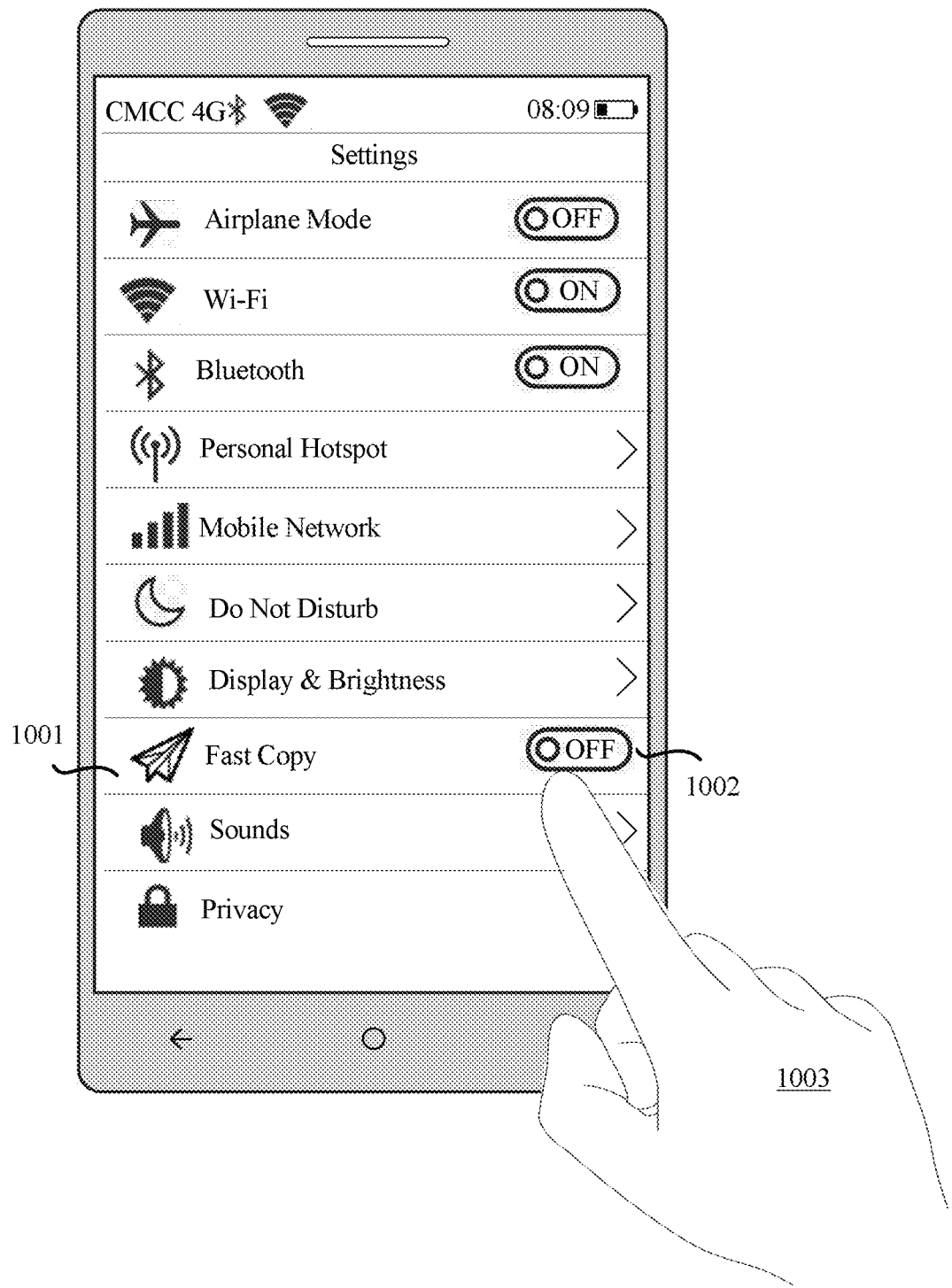
FIG. 10A and FIG. 10B are schematic diagrams of some graphical user interfaces displayed on an electronic device according to some other embodiments.
Figure 10B:
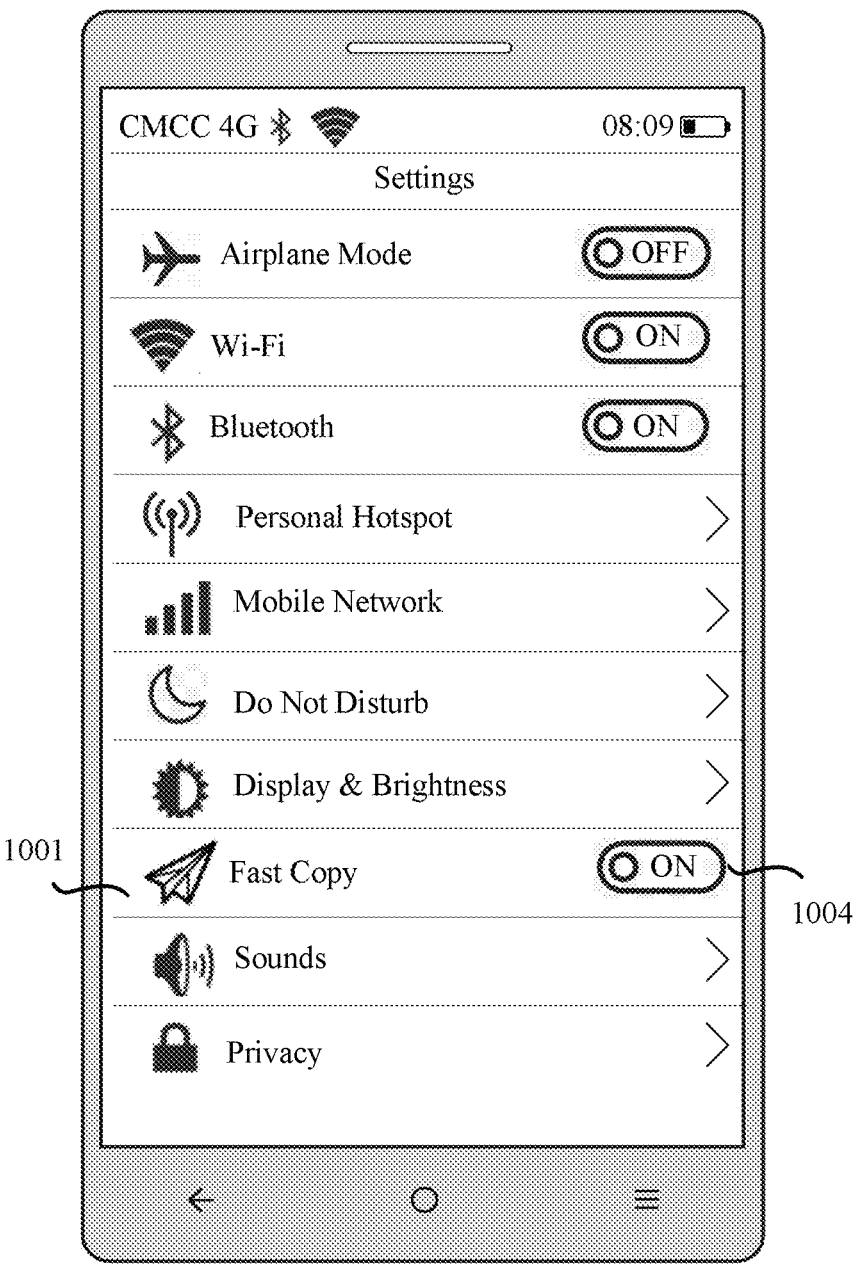

In some other embodiments of this application, the electronic device may alternatively receive an input from the user, and enable the fast copying function based on the input. The fast copying function may be enabled by receiving the input from the user, and may further be disabled by receiving another input from the user. For example, as shown in FIG. 10A, the input may be specifically that the user taps a control on a setting menu. FIG. 10A shows a setting interface of the electronic device. A submenu 1001 is a menu of the fast copying function, and a control 1002 indicates that the function may be enabled or disabled. For example, when the electronic device detects a touch event of a finger 1003 of the user for the control 1002, the function is enabled in response to the touch event. As shown in FIG. 10B, the control 1002 is changed to a control 1004, indicating that the fast copying function has been enabled. In some other embodiments of this application, a prompt box may also be displayed on the touchscreen while the control 1004 is displayed, to further give, to the user, an indication that the user can perform a fast copying operation. In this way, user experience is further improved. In some other embodiments of this application, the input may alternatively be that the finger of the user touches and holds blank space or touches and holds an icon of an application on the touchscreen for a time that exceeds a preset time; or may be that a preset gesture is drawn at any location or at a specific location on the touchscreen. The electronic device may enable or disable a fast edition function in response to the input. In this way, the electronic device can flexibly enable or disable the function based on the input from the user, to further improve user experience.

In some other embodiments of this application, step S800-1 and step S800-2 may also be performed after step S801 and before step S802. In this way, the electronic device can quickly enable the function when the user needs the function, to conveniently and flexibly perform fast copying.

In some other embodiments of this application, in step S802, the fifth touch event may alternatively be that the finger of the user lightly taps (for example, taps or double taps) a fingerprint button 1105, and keeps contact with the fingerprint button 1105 (in other words, the finger does not leave the fingerprint button). After the finger of the user lifts from the fingerprint button 1105, the electronic device may switch the data in the fast copying state to a normal state in response to the lifting event. The normal state may be a state of the data before the data is in the fast copying state. In the state, the user may perform a normal operation on the data in the GUI, for example, touch and hold the data, and then select data. In step S804, the sixth touch event may be a slide gesture of another finger of the user for the data in the fast copying state on the touchscreen. Therefore, an application scenario in this embodiment of this application may be specifically as follows: The finger of the user taps the fingerprint button 1105 and keeps contact with the fingerprint button 1105. In this case, the another finger of the user performs a slide operation on the data displayed on the touchscreen, and in response to the slide operation, the electronic device stores, in the clipboard, subdata (for example, the subdata 904) corresponding to the slide operation on the touchscreen. After the finger of the user lifts from the fingerprint button 1105, data originally in the fast copying state is restored to the normal state in response to the lifting event. In this case, when the user performs a slide operation again on the data displayed on the touchscreen, subdata corresponding to the slide operation cannot be stored in the clipboard.

The fingerprint button may be used to extend a button function, and has the following common extended key values: a tap, touch and hold, and a slide. In the foregoing embodiment, the electronic device may identify an action_down event and an action up event of the fingerprint button. The action_down event means that the finger of the user taps the fingerprint button, and the action up event means that the finger of the user lifts from the fingerprint button. The electronic device may mark the action_down event of the fingerprint button with a flag bit (FLAG), and the electronic device may detect the action_down event of the fingerprint button. If the flag bit FLAG=1 of the action down event is detected, the electronic device determines that a touch and hold event occurs on the fingerprint button, and enables the fast copying function based on the touch and hold event.

In some other embodiments of this application, after the finger of the user lightly taps the fingerprint button 1105 and keeps contact with the fingerprint button 1105, the electronic device may collect a fingerprint of the user by using a fingerprint recognizer 112 in the fingerprint button 1105, and compare the fingerprint with a prestored valid fingerprint for verification. The electronic device enables the data in the GUI of the application to be in the fast copying state only after verification on the fingerprint succeeds. Then, another finger of the user may make a slide gesture for the data in the fast copying state on the touchscreen, and in response to the slide gesture, the electronic device may store, in the clipboard, subdata corresponding to the slide gesture. According to the technical solution of this embodiment of this application, fast copying can be performed only after the verification on the fingerprint succeeds, so that processing efficiency of the electronic device is improved, and security of the electronic device is also enhanced.

In some other embodiments of this application, after step S805, the electronic device may paste, based on a user operation, the data stored in the clipboard. Therefore, the method may further include the following steps.

Step S806: The electronic device detects a seventh touch event of the user for an input box on the touchscreen. The seventh touch event may be the same as the foregoing third touch event. For example, the seventh touch event may be that the finger (or the stylus) of the user touches and holds or heavily presses a location corresponding to the input box on the touchscreen (namely, a touch and hold gesture or a heavy press gesture for the input box). In this embodiment, a specific form of the seventh touch event is not limited.

Step S807: Display a to-be-pasted list on the touchscreen in response to the seventh touch event, where the to-be-pasted list may include two or more pieces of data. All the data is data stored in the clipboard. In some embodiments of this application, the to-be-pasted list may be displayed above the input box. The seventh touch event may alternatively be that the finger of the user lightly taps (for example, taps or double taps) the fingerprint button 1105, and keeps contact with the fingerprint button 1105 (in other words, the finger does not leave the fingerprint button). In this embodiment, the electronic device may identify the action_down event and the action up event of the fingerprint button. The action_down event means that the finger of the user taps the fingerprint button, and the action up event means that the finger of the user lifts from the fingerprint button. The electronic device may mark the action_down event of the fingerprint button with a flag bit (FLAG), and the electronic device may detect the action_down event of the fingerprint button. If the flag bit FLAG=1 of the action_down event is detected, the electronic device determines that a touch and hold event occurs on the fingerprint button. In other words, in this embodiment, the user lightly taps the fingerprint button instead of performing a prior-art operation in which the screen needs to be touched and held.

Step S808: The electronic device detects an eighth touch event of the user for the to-be-pasted list on the touchscreen. For example, the eighth touch event may be that the finger (or the stylus) of the user lightly taps a location corresponding to the to-be-pasted list on the touchscreen (namely, a tap gesture for the to-be-pasted list). In this embodiment, a specific form of the eighth touch event is not limited.

Step S809: Display, in the input box, one or more pieces of data in the to-be-pasted list in response to the eighth touch event.

In some other embodiments of this application, after the fast copying function is enabled, the electronic device may consider by default that the data copied into the clipboard is in a private queue. Alternatively, after the fast copying function is enabled, the electronic device may consider by default that the data copied into the clipboard is in a public queue. In this way, fast copying can be ensured, and data security can be further enhanced.

In some other embodiments of this application, after step S809, the method may further include step S810: After displaying the data corresponding to the eighth touch event in the input box, the electronic device can erase the data stored in the clipboard. In this way, storage space of the electronic device can be saved.

Figure 12:
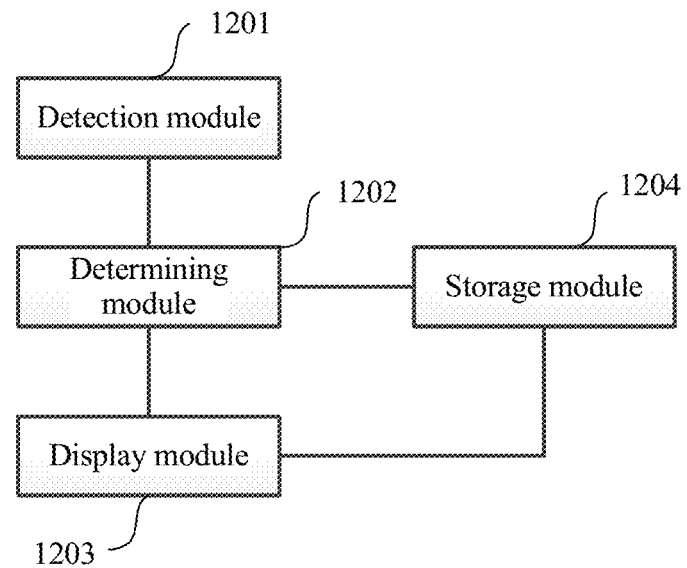
FIG. 12 is a schematic structural diagram of an apparatus according to some embodiments.

FIG. 12 is a schematic structural diagram of a data processing apparatus according to an embodiment of this application. As shown in FIG. 12, the apparatus may include a detection module 1201, a determining module 1202, a display module 1203, and a storage module 1204. The detection module 1201 is configured to detect an input from a user. The input from the user may be various touch events. The determining module 1202 is connected to the detection module 1201, and is configured to enable or disable a fast copying function after the detection module 1201 detects the input from the user. The display module 1203 is connected to the determining module 1202 and the storage module 1204, and is configured to display a graphical user interface (GUI) that is of an application and that is stored in the storage module 1204. The GUI may include data in different formats, such as a text, a picture, and a video. The storage module 1204 is configured to store various types of data, such as the GUI. In addition, the storage module 1204 is further configured to store data in a clipboard.

The determining module 1202 may enable the fast copying function after receiving a first input detected by the detection module 1201. In this case, data displayed on the display module 1203 is enabled to be in a fast copying state.

The fast copying state may specifically mean that the data may be continuously selected by the user for a plurality of times and stored in the clipboard. That the data in the GUI is in the fast copying state may further be presented visually or acoustically, to give, to the user, a prompt that the user can perform a copying operation. For example, the data in the fast copying state is displayed on the display module 1203 in full screen, through jittering, or through magnification. In some embodiments of this application, the first input may be a double tap event that a finger of the user double taps the detection module 1201, or may be a knock event that a knuckle of the user knocks the detection module 1201. In this embodiment, a specific form of the first input is not limited.

The detection module 1201 is further configured to detect a touch event of the user. The touch event may be a slide gesture for some data displayed on the display module 1203. The determining module 1202 stores, in the clipboard of the storage module 1204 based on the slide gesture detected by the detection module 1201, the data corresponding to the slide gesture. In the foregoing technical solution, after the fast copying function is enabled, the user can complete a copying operation only by lightly sliding on the detection module 1201 with the finger for data that needs to be copied. If the user further needs to copy other data after completing a previous fast copying operation, the user can fast complete another copying operation only by lightly sliding on the detection module 1201 with the finger for the other data. This operation manner is more efficient than a prior-art copying operation. The method can greatly improve processing efficiency of the apparatus, simplify operation steps, and further improve use experience of the user.

In some other embodiments of this application, the detection module 1201 is further configured to detect another touch event of the user, and the determining module 1202 sends, to the display module 1203 based on the touch event, an instruction for displaying another graphical user interface. After receiving the instruction from the determining module 1202, the display module 1203 displays the another graphical user interface. The graphical user interface includes an input box. The display module 1203 is further configured to display a to-be-pasted list stored in the storage module 1204. The detection module 1201 is further configured to detect another input from the user, and the determining module 1202 displays, in the input box, a piece of data in the to-be-pasted list.

In the foregoing embodiment, the detection module 1201 may be specifically a touch panel, the display module 1203 may be a display screen, the determining module 1202 may be a processor, and the storage module 1204 may be a nonvolatile readable memory.

Figure 13:
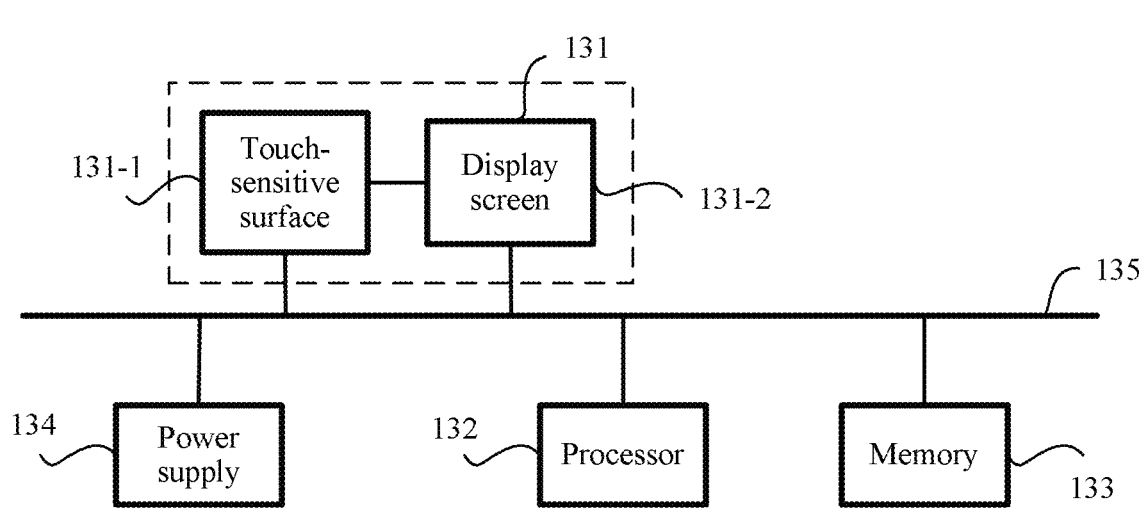
FIG. 13 is a schematic structural diagram of an electronic device according to some embodiments.

FIG. 13 is a schematic structural diagram of an electronic device 130 according to an embodiment of this application. The electronic device 130 may include a touchscreen 131 (which may specifically include a touch-sensitive surface 131-1 and a display screen 131-2), a processor 132, a memory 133, and a power supply 134, and may further include one or more communications buses 135 for connecting the foregoing components. The electronic device 130 in this embodiment of this application may be configured to perform the methods in the foregoing embodiments and the implementation solutions in FIG. 4 and FIG. 8.

Figure 14:
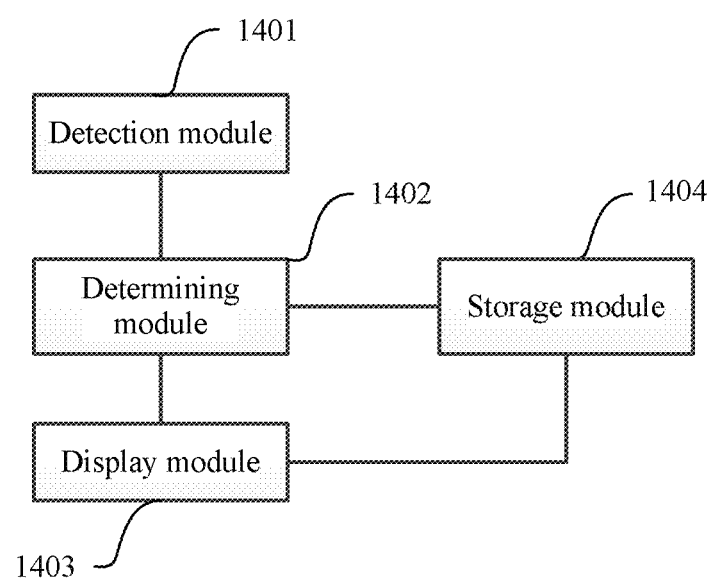
FIG. 14 is a schematic structural diagram of an apparatus according to some other embodiments.

FIG. 14 is a schematic structural diagram of another data processing apparatus according to an embodiment of this application. As shown in FIG. 14, the apparatus may include a detection module 1401, a determining module 1402, a display module 1403, and a storage module 1404. The detection module 1401 is configured to detect an input from a user. The input from the user may be various touch events. The determining module 1402 is connected to the detection module 1401, and is configured to: after the detection module 1401 detects the input from the user, determine an instruction corresponding to the input. The display module 1403 is connected to the determining module 1402 and the storage module 1404, and is configured to display a graphical user interface (GUI) that is of an application and that is stored in the storage module 1404. The GUI may include data in different formats, such as a text, a picture, and a video. The storage module 1404 is configured to store various types of data, such as the GUI. In addition, the storage module 1404 is further configured to store data in a clipboard. For a form of the clipboard and the data in the clipboard, refer to examples in FIG. 6, FIG. 7A, and FIG. 7B.

The display module 1403 displays a graphical user interface of a first application. The detection module 1401 detects a first touch event of the user. In response to the first touch event, data that is corresponding to the first touch event and that is displayed on the display module 1403 is selected, and a first control and a second control are displayed on the display module 1403. The first control is used to copy the data into a private queue of the clipboard, and data in the private queue can be pasted only inside the first application. The second control is used to copy the data into a public queue of the clipboard, and data in the public queue is pasted in any application.

The detection module 1401 is further configured to detect a second touch event for the first control or the second control. The determining module 1402 is further configured to store the selected data in the private queue or the public queue in response to the second touch event.

The detection module 1401 is further configured to detect a third touch event for an input box in a second application. In response to the third touch event, the determining module 1402 determines a to-be-pasted list that needs to be displayed. The to-be-pasted list includes two or more pieces of data, and the data comes from the clipboard. The to-be-pasted list displays the data and an application identifier corresponding to the data. The display module 1403 displays the to-be-pasted list determined by the determining module 1402.

The detection module 1401 is further configured to detect a fourth touch event of the user for the to-be-pasted list; and one or more pieces of data in the to-be-pasted list are displayed in the input box in response to the fourth touch event.

That the determining module 1402 determines a to-be-pasted list that needs to be displayed may specifically include: in response to the third touch event, determining, by the determining module 1402, the second application corresponding to the third touch event; and determining, by the determining module 1402, the to-be-pasted list based on the determined second application and data stored in the clipboard. Specifically, the determining module 1402 may determine first data in the public queue and second data from the second application in the private queue based on the second application. Then, the determining module 1402 may determine the to-be-pasted list based on the first data and the second data. The display module 1403 displays the to-be-pasted list. In addition, the electronic device shown in FIG. 14 may further perform specific steps in the foregoing embodiments. Details are not described herein. Some other embodiments of this application disclose an electronic device. The electronic device may include: a touchscreen, where the touchscreen includes a touch-sensitive surface (for example, a touch panel) and a display; one or more processors; a memory; a plurality of applications; and one or more programs. The one or more programs are stored in the memory, and are configured to be executed by the one or more processors. The one or more programs include an instruction, and the instruction may be used to perform the methods shown in FIG. 4 and FIG. 8 and corresponding embodiments of the methods.

Figure 15A:
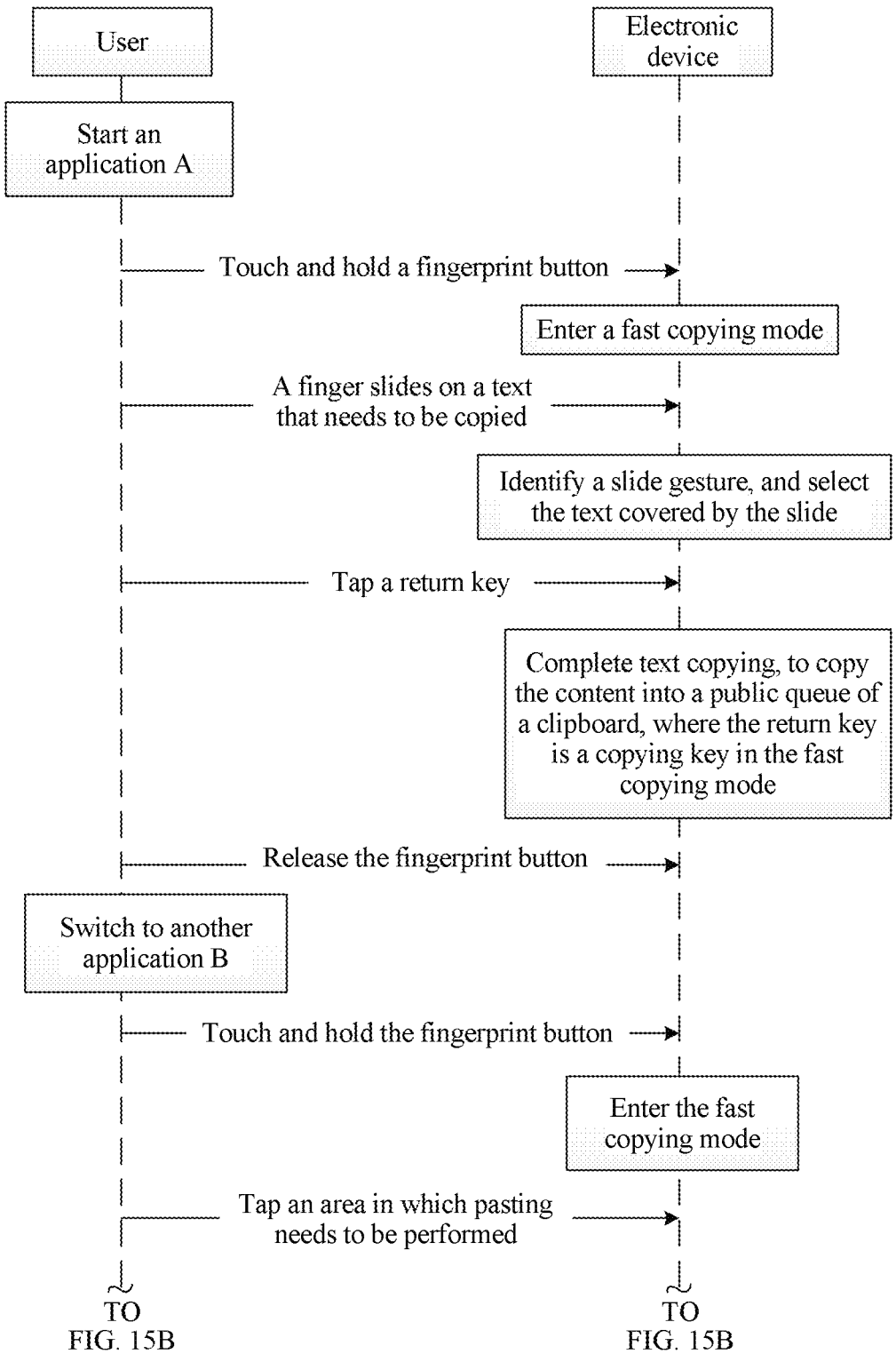
FIG. 15A and FIG. 15B are schematic flowcharts of a scenario according to some embodiments.
Figure 15B:
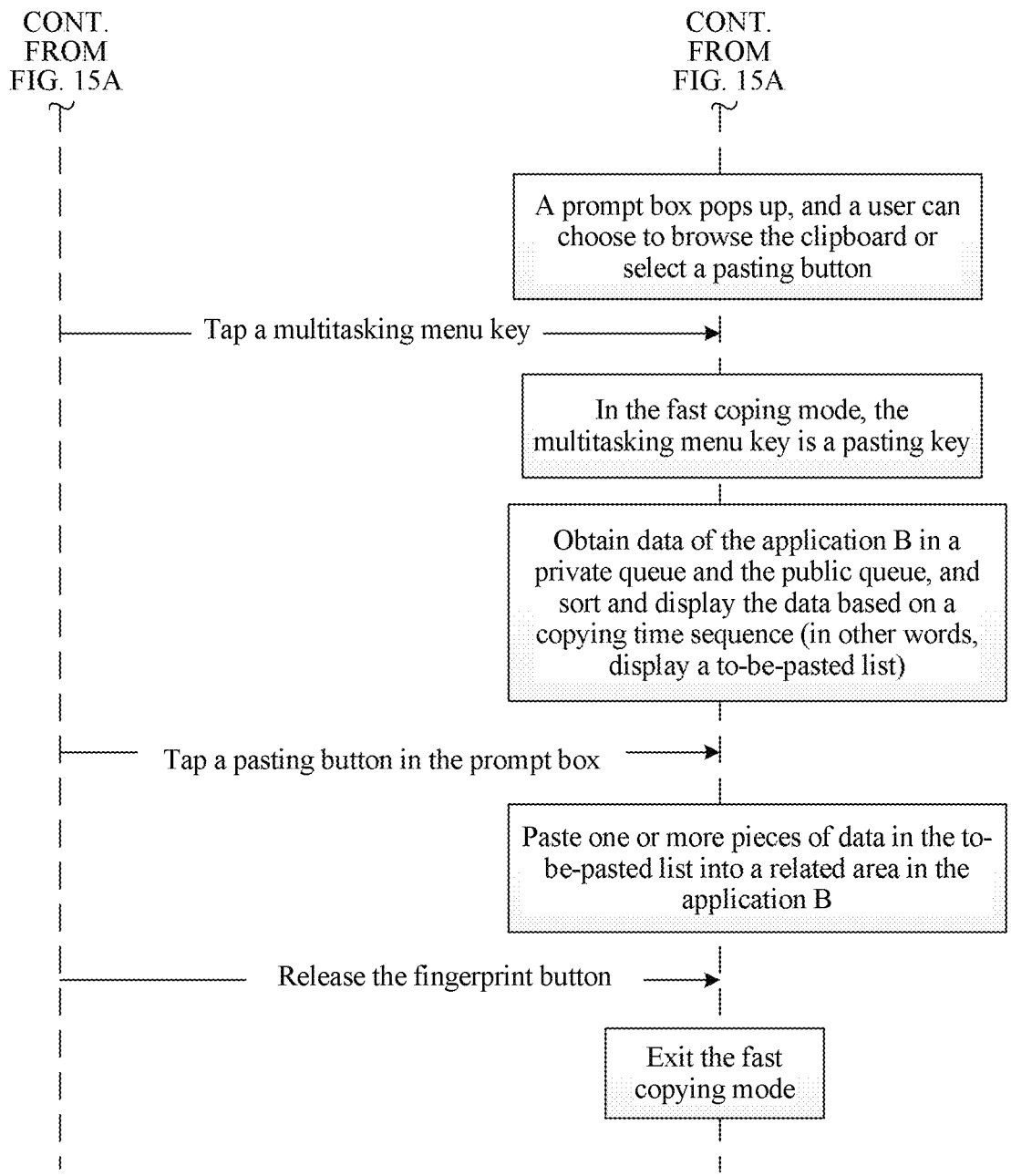

FIG. 15A and FIG. 15B are a schematic diagram of a specific application scenario according to some other embodiments of this application. The specific application scenario is an example scenario in which fast copying and pasting are performed in two different applications. Specifically, a user taps an icon that is of an application A and that is displayed on a touchscreen 104 of an electronic device 100, and the application A is started. Then, the user wants to copy a text in the application A, and therefore the user can touch and hold a fingerprint button 1105 with a finger. In response to the foregoing action of the user, the electronic device enables data (for example, a text, a picture, or a video) displayed in the application A to be in a fast copying mode. Then, the finger of the user makes a slide gesture on the text that needs to be copied. The electronic device identifies the slide gesture, and selects the text covered by the slide gesture. In this case, the user may tap a return key 1107, and in a fast copying state, an event of tapping the return key may be determined by the electronic device as a copying operation. Therefore, in response to the tap event, the electronic device may copy and store the selected text in a clipboard. Specifically, the selected text may be stored in a public queue of the clipboard.

The electronic device determines that the finger of the user lifts from the fingerprint button 1105. The user operates the electronic device 100 to switch from the application A to another application B, and to display the application B on the touchscreen 104 of the electronic device 100. In this case, the user touches and holds the fingerprint button 1105, and the electronic device enters the fast copying mode in response to the event. Then, the user taps, on the touchscreen 104, an area in which pasting needs to be performed. A prompt box may pop up on the touchscreen 104. The prompt box may display a to-be-pasted list, or the user can choose to browse data in the clipboard; or the prompt box may display a pasting control. The user taps a multitasking menu key 1108. In the fast copying mode, the tapping the multitasking menu key 1108 is determined by the electronic device as a pasting operation (to be specific, the multitasking menu key 1108 may be considered as a pasting key). Therefore, the electronic device obtains data of the application B in a private queue and the public queue of the clipboard, and sorts and displays the data based on a copying time sequence (in other words, displays the to-be-pasted list). Then, the user taps a pasting button in the prompt box, and the electronic device may paste one or more pieces of data in the to-be-pasted list into a related area in the application B. Then, the finger of the user lifts from the fingerprint button 1105, and the electronic device exits the fast copying mode in response to the event.

In the foregoing embodiments, the term "light tap" may be contrary to the term "heavy press". To be specific, "light tap" indicates a gesture that the finger of the user lightly taps the touchscreen (or another touch panel), and "heavy press" indicates a gesture that the finger of the user taps the touchscreen (or another touch panel), and then applies pressure to the touchscreen. The pressure may be detected by a related sensor (for example, a pressure sensor) configured in the touchscreen. In addition, the light tap may be a tap event, or may be a double tap event, or the like. The term "touch and hold" is also a term in the field, and indicates a gesture that the finger of the user keeps staying on the touchscreen within a preset time after lightly taping the touchscreen (or another touch panel).

As used in the foregoing embodiments, based on the context, the term "when . . . " may be interpreted as a meaning of "if . . . ", "after", "in response to . . . ", or "in response to detecting . . . ". Similarly, based on the context, the phrase "when . . . is determined" or "if (a stated condition or event) is detected" may be interpreted as a meaning of "if . . . is determined", "in response to determining . . . ", "when (a stated condition or event) is detected", or "in response to detecting (a stated condition or event)".

All or some of the foregoing embodiments may be implemented by software, hardware, firmware, or any combination thereof. When being implemented by software, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, by using a coaxial cable, an optical fiber, or a digital subscriber line) or in a wireless (for example, infrared, wireless, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

For a purpose of explanation, the foregoing descriptions are provided with reference to specific embodiments. However, the foregoing example discussion is not intended to be detailed, and is not intended to limit this application to a disclosed precise form. Based on the foregoing teaching content, many modification forms and variation forms are possible. The embodiments are selected and described to fully illustrate the principles of this application and practical application of the principles, so that another person skilled in the art can make full use of this application and various embodiments that have various modifications applicable to conceived specific usage.

The invention claimed is:

1. A method implemented by an electronic device having a touchscreen, wherein the method comprises:
   displaying a first graphical user interface of a first application on the touchscreen, wherein the first graphical user interface comprises a text;
   receiving an input from a user, wherein the input comprises tapping a fingerprint button and keeping contact with the fingerprint button;
   enabling a fast copying function in response to the input;
   detecting a slide gesture for first data in the text after the fast copying function is enabled;

generating the slide gesture after tapping the fingerprint button and keeping contact with the fingerprint button;

displaying the text in full screen on the touchscreen after the fast copying function is enabled, further displaying an application identifier in a to-be-pasted list, wherein the application identifier is an application icon or an application name of a second application, and wherein the to-be-pasted list further displays a source identifier of second data; and storing, in a clipboard, the first data corresponding to the slide gesture.

2. The method of claim 1, further comprising:

displaying a second graphical user interface of the second application on the touchscreen, wherein the second graphical user interface comprises an input box;

detecting a touch event of the user on the input box;

displaying the to-be-pasted list on the touchscreen in response to the touch event, wherein the to-be-pasted list comprises two or more pieces of the first data;

detecting a touch gesture of the user for the to-be-pasted list;

obtaining the second data corresponding to the touch gesture; and displaying the second data in the input box.

3. The method of claim 2, further comprising erasing the first data after displaying the second data.

4. The method of claim 2, wherein the to-be-pasted list displays the second data and an application identifier corresponding to the second data.

5. The method of claim 4, wherein the source identifier marks data from different copying sources differently, wherein the to-be-pasted list is displayed above the input box, and wherein in response to tapping the fingerprint button and keeping contact with the fingerprint button, the method further comprises:

collecting a fingerprint of the user using a fingerprint recognizer in the fingerprint button;

comparing the fingerprint with a prestored fingerprint for verification; and enabling the fast copying function only after the verification on the fingerprint succeeds.

6. A method implemented by an electronic device having a touchscreen, wherein the method comprises:

displaying a graphical user interface of a first application on the touchscreen;

detecting a first touch event on the touchscreen;

selecting data corresponding to the first touch event;

displaying, in response to the first touch event, a first control and a second control on the touchscreen, wherein the first control is for copying the data into a private queue of a clipboard to be pasted only inside the first application, and wherein the second control is for copying the data into a public queue of the clipboard to be pasted in any application;

detecting a second touch event for the first control or the second control on the touchscreen;

storing the data in the private queue or the public queue in response to the second touch event;

detecting a third touch event for an input box in a second application on the touchscreen;

displaying a to-be-pasted list on the touchscreen in response to the third touch event, wherein the to-be-pasted list comprises two or more pieces of second data from the clipboard;

detecting a fourth touch event of a user for the to-be-pasted list on the touchscreen; and displaying, in the input box, one or more pieces of the second data in the to-be-pasted list in response to the fourth touch event.

7. The method of claim 6, wherein displaying the to-be-pasted list on the touchscreen comprises:

identifying the second application corresponding to the third touch event;

obtaining the to-be-pasted list based on the second application and the second data stored in the clipboard; and displaying the to-be-pasted list on the touchscreen.

8. The method of claim 7, further comprising:

identifying third data in the public queue and fourth data from the second application in the private queue; and obtaining the to-be-pasted list based on the third data and the fourth data.

9. The method of claim 6, wherein the to-be-pasted list displays the second data and an application identifier corresponding to the second data.

10. The method of claim 9, further comprising:

detecting the first touch event when a finger of the user taps the touchscreen and moves for a distance without leaving the touchscreen;

detecting the second touch event when the finger taps a location corresponding to the first control or the second control on the touchscreen;

detecting the third touch event when the finger touches and holds or presses a location corresponding to the input box on the touchscreen; and detecting the fourth touch event when the finger taps a location corresponding to the to-be-pasted list on the touchscreen, wherein the application identifier is an application icon or name of the second application, wherein the to-be-pasted list further displays a source identifier of the data, wherein the source identifier marks data from different copying sources differently, and wherein the to-be-pasted list is displayed above the input box.

11. An electronic device, comprising:

a touchscreen;

a processor coupled to the touchscreen; and a memory coupled to the touchscreen and the processor and configured to store instructions, wherein when executed by the processor, the instructions cause the electronic device to:

display a first graphical user interface of a first application on the touchscreen, wherein the first graphical user interface comprises a text;

receive an input from a user, wherein the input comprises tapping a fingerprint button and keeping contact with the fingerprint button;

enable a fast copying function in response to the input;

detect a slide gesture for first data in the text after the fast copying function is enabled;

generate the slide gesture after tapping the fingerprint button and keeping contact with the fingerprint button;

display the text in full screen on the touchscreen after the fast copying function is enabled; and further displaying an application identifier in a to-be-pasted list, wherein the application identifier is an application icon or an application name of a second application, and wherein the to-be-pasted list further displays a source identifier of second data; and store, in a clipboard, the first data corresponding to the slide gesture.

12. The electronic device of claim 11, wherein when executed by the processor, the instructions further cause the electronic device to:
display a second graphical user interface of the second application on the touchscreen, wherein the second graphical user interface comprises an input box;
detect a touch event of the user on the input box;
display the to-be-pasted list on the touchscreen in response to the touch event, wherein the to-be-pasted list comprises two or more pieces of the first data;
detect a touch gesture of the user for the to-be-pasted list;
identify the second data corresponding to the touch gesture; and
display the second data in the input box.

13. The electronic device of claim 11, wherein when executed by the processor, the instructions further cause the electronic device to erase the first data.

14. The electronic device of claim 12, wherein the to-be-pasted list displays the second data and an application identifier corresponding to the second data.

15. An electronic device, comprising:
a touchscreen;
a processor coupled to the touchscreen; and
a memory coupled to the touchscreen and the processor and configured to store instructions, wherein when executed by the processor, the instructions cause the electronic device to:
display a first graphical user interface of a first application on the touchscreen;
detect a first touch event on the touchscreen;
select data corresponding to the first touch event;
display, in response to the first touch event, a first control and a second control on the touchscreen, wherein the first control is for copying the data into a private queue of a clipboard to be pasted only inside the first application, and wherein the second control is for copying the data into a public queue of the clipboard to be pasted in any application;
detect a second touch event for the first control or the second control on the touchscreen;
store the data in the private queue or the public queue in response to the second touch event;
detect a third touch event for an input box in a second application on the touchscreen;
display a to-be-pasted list on the touchscreen in response to the third touch event, wherein the to-be-pasted list comprises two or more pieces of second data comes from the clipboard;
detect a fourth touch event of a user for the to-be-pasted list on the touchscreen; and
display, in the input box, one or more pieces of the second data in the to-be-pasted list in response to the fourth touch event.

16. The electronic device of claim 15, wherein when executed by the processor, the instructions further cause the electronic device to:
identify the second application corresponding to the third touch event;
obtain the to-be-pasted list based on the second application and data stored in the clipboard; and
display the to-be-pasted list on the touchscreen.

17. The electronic device of claim 16, wherein when executed by the processor, the instructions further cause the electronic device to:
identify first data in the public queue and second data from the second application in the private queue; and
obtain the to-be-pasted list based on the first data and the second data.

18. The electronic device of claim 15, wherein when executed by the processor, the instructions further cause the electronic device to detect the first touch event when a finger of the user taps the touchscreen and moves for a distance without leaving the touchscreen.

19. The electronic device of claim 15, wherein when executed by the processor, the instructions further cause the electronic device to detect the second touch event when a finger taps a location corresponding to the first control or the second control on the touchscreen.

20. The electronic device of claim 15, wherein when executed by the processor, the instructions further cause the electronic device to detect the third touch event when a finger touches and holds or presses a location corresponding to the input box on the touchscreen.

* * * * *